(12) United States Patent
Mukai et al.

(10) Patent No.: US 7,436,525 B2
(45) Date of Patent: Oct. 14, 2008

(54) THREE-DIMENSIONAL SHAPE MEASURING METHOD, THREE-DIMENSIONAL SHAPE MEASURING APPARATUS, AND FOCUS ADJUSTING METHOD

(75) Inventors: Takayuki Mukai, Sakai (JP); Yoshihisa Abe, Sakai (JP)

(73) Assignee: Konica Minolta Sensing, Inc., Sakai-Shi (JP)

( * ) Notice: Subject to any disclaimer, the term of this patent is extended or adjusted under 35 U.S.C. 154(b) by 0 days.

(21) Appl. No.: 11/810,939

(22) Filed: Jun. 7, 2007

(65) Prior Publication Data
US 2007/0285672 A1 Dec. 13, 2007

(30) Foreign Application Priority Data
Jun. 8, 2006 (JP) .............................. 2006-160088

(51) Int. Cl.
*G01B 11/24* (2006.01)
(52) U.S. Cl. ................... 356/603; 356/601; 356/604; 356/609
(58) Field of Classification Search ................. 356/601, 356/603, 604, 609
See application file for complete search history.

(56) References Cited

U.S. PATENT DOCUMENTS 6,603,103 B1 * 8/2003 Ulrich et al. ................ 250/205

2004/0246495 A1 * 12/2004 Abe ............................. 356/603
2005/0249400 A1    11/2005 Fukumoto ................... 382/154

FOREIGN PATENT DOCUMENTS

| JP | 5-107463 A    | 4/1993  |
| JP | 8-16608 B2    | 2/1996  |
| JP | 2000-283739 A | 10/2000 |
| JP | 2005-321278 A | 11/2005 |

* cited by examiner

*Primary Examiner*—Roy M Punnoose
(74) *Attorney, Agent, or Firm*—Sidley Austin LLP

(57) ABSTRACT

An operation of projecting slit light onto an object to be measured and receiving light reflected thereon, and an operation of acquiring a two-dimensional image concerning the object to be measured are repeated a certain number of times by changing a focal length. An imaging contrast is calculated with respect to each of areas on the two-dimensional images acquired at the different focal lengths. A high contrast area where the imaging contrast exceeds a predetermined threshold value is extracted with respect to each of the two-dimensional images acquired at the different focal lengths. Distance information concerning the respective areas is acquired by performing triangulation with respect to each of the high contrast areas. Position adjustment of measurement dimensions is performed in such a manner that the areas are included in the measurement dimensions having the predetermined measurement depth, based on the distance information.

10 Claims, 21 Drawing Sheets

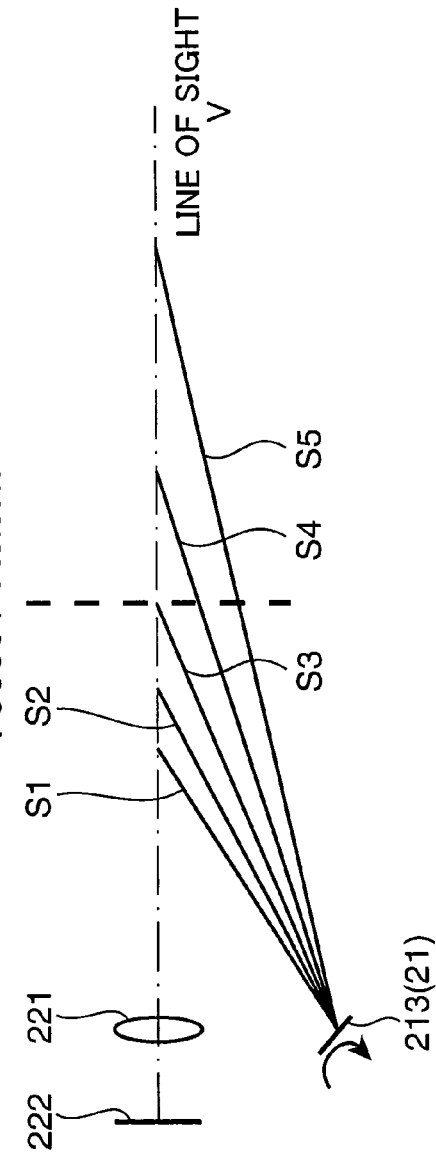
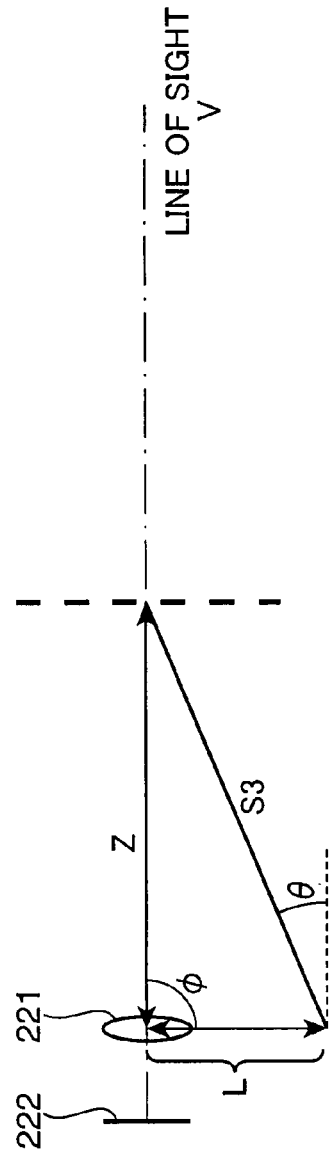
FIG. 19A
FIG. 19B

THREE-DIMENSIONAL SHAPE MEASURING METHOD, THREE-DIMENSIONAL SHAPE MEASURING APPARATUS, AND FOCUS ADJUSTING METHOD

This application is based on Japanese Patent Application No. 2006-160088 filed on Jun. 8, 2006, the contents of which are hereby incorporated by reference.

BACKGROUND OF THE INVENTION

1. Field of the Invention

The present invention relates to a non-contact three-dimensional shape measuring method for measuring a three-dimensional shape of an object to be measured by projecting predetermined measurement light onto the object to be measured, and receiving light reflected thereon, as well as a non-contact three-dimensional shape measuring apparatus, and a focus adjusting method suitable for the method and the apparatus.

2. Description of the Related Art

Three-dimensional data concerning an object to be measured can be obtained by a non-contact three-dimensional digitizer adopting e.g. a light projection method, which is also called as a light cutting method. The three-dimensional digitizer is adapted to acquire three-dimensional data concerning an object to be measured, based on imaging data obtained by projecting slit pattern light onto the object to be measured and receiving light reflected thereon (see e.g. Japanese Unexamined Patent Publication No. 2005-321278).

The three-dimensional digitizer is provided with an autofocus (AF) function of a light receiving optical system with respect to the object to be measured. Passive AF of obtaining a focus position based on an imaging contrast of a two-dimensional image which has been obtained by imaging an object to be measured, and an active AF of obtaining a focus position by projecting laser light onto an object to be measured, receiving the laser light reflected thereon, and metering the light by the triangulation principle are widely used as the AF function. Generally, the three-dimensional digitizer has a certain depthwise dimension for measurement (hereinafter, called as "measurement depth") including a front position and a rear position with respect to a focus position, as measurement dimensions. The position of the measurement depth with respect to the object to be measured is adjusted depending on a focus operation using the AF function.

Japanese Unexamined Patent Publication No. Hei 5-107463, Japanese Examined Patent Publication No. Hei 8-16608, and Japanese Unexamined Patent Publication No. 2000-283739 disclose examples of the methods for acquiring distance information concerning an object to be measured. According to these methods, the distance to an object to be measured is measured by projecting pattern light onto the object to be measured, and distance information is acquired by using different pattern images. It is possible to adjust the position of the measurement depth with respect to the object to be measured, using the aforementioned distance measuring method based on pattern light projection.

The passive AF fails to provide sufficient contrast in the case where the ambient light around an object to be measured is dark, or in the case where the object to be measured is a flat member such as an outer body of an automobile. In the above cases, a focus position error may be unduly increased. On the other hand, the active AF control is advantageous in accurately obtaining the focus position. However, the position of the measurement depth may not be properly adjusted depending on a point on the object to be measured having a three-dimensional shape, as a metering point. Specifically, in the case where the object to be measured has a relatively large projected surface or recessed surface, it is desirable to adjust the position of the measurement depth in such a manner that both of the projected surface and the recessed surface are included in the measurement depth. If, however, the projected surface is selected as the metering point, the recessed surface may be out of the measurement depth, which resultantly fails to measure the shape of the recessed surface. In this case, a measurement of the recessed surface is required after a position adjustment is performed in such a manner that the recessed surface is included in the measurement depth, which may increase the number of times of the measurement.

According to the distance measuring method based on pattern light projection, in view of a necessity that different pattern images are used to obtain distance information, it is required to perform an imaging operation multiple times, while changing the pattern light, and it takes a long time to perform an imaging processing. Accordingly, a time may be needed to adjust the position of the measurement depth, even if the distance information concerning the object to be measured is obtained.

SUMMARY OF THE INVENTION

In view of the above problems residing in the conventional examples, it is an object of the present invention to provide a three-dimensional shape measuring method that enables to perform a position adjustment of a measurement depth speedily and accurately, as well as a three-dimensional shape measuring apparatus, and a focus adjusting method.

A three-dimensional shape measuring method according to an aspect of the invention is a method for measuring a three-dimensional shape of an object to be measured after performing a focus adjustment with respect to the object to be measured, by using a non-contact three-dimensional shape measuring apparatus having a predetermined measurement depth including a front position and a rear position with respect to a focus position, as measurement dimensions. The method includes, in performing the focus adjustment: repeating an operation of acquiring a two-dimensional image concerning the object to be measured by projecting predetermined pattern light onto the object to be measured and by receiving light reflected thereon, and an operation of calculating an imaging contrast on a plurality of areas of the acquired two-dimensional image a predetermined number of times, with a focal length of the three-dimensional shape measuring apparatus being changed each time the acquiring operation and the calculating operation are performed; extracting a high contrast area where the imaging contrast exceeds a predetermined threshold value with respect to each of the two-dimensional images acquired at the different focal lengths; acquiring distance information concerning the object to be measured by triangulation, based on a position on the object to be measured corresponding to the high contrast area, a light projecting position, and a light receiving position; and performing a position adjustment of the measurement dimensions with respect to the object to be measured, based on the distance information.

These and other objects, features and advantages of the present invention will become more apparent upon reading the following detailed description along with the accompanying drawing.

BRIEF DESCRIPTION OF THE DRAWINGS

FIGS. 19A and 19B are schematic diagrams for describing an approach for estimating a position where silt light is projected.

DETAILED DESCRIPTION OF THE PREFERRED EMBODIMENTS

Figure 1:
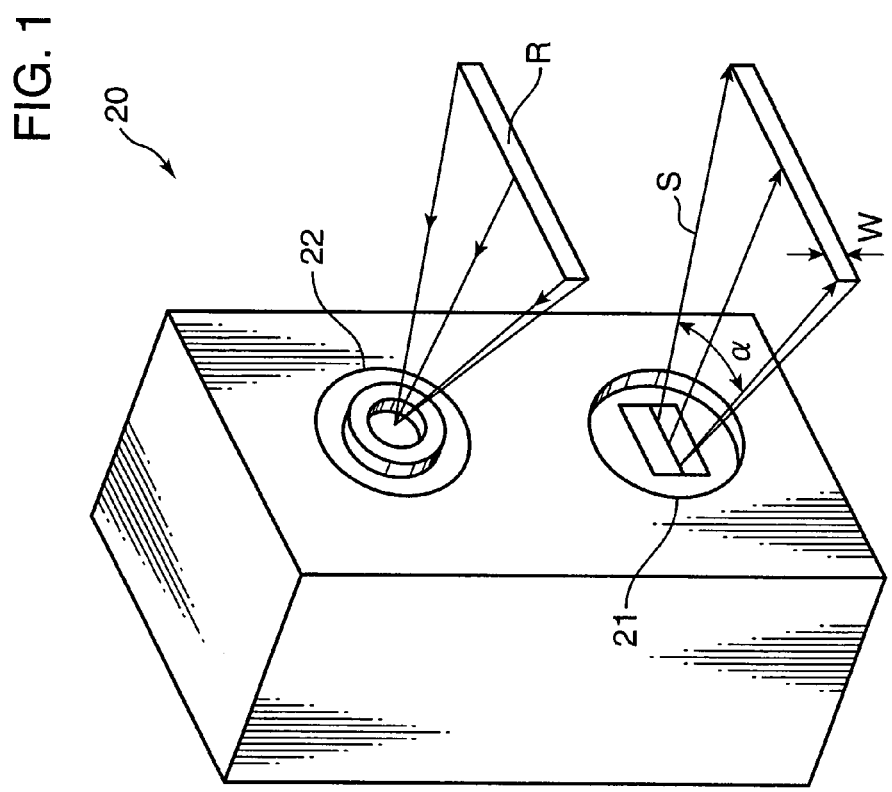
FIG. 1 is a perspective view showing an external appearance of a three-dimensional shape measuring apparatus embodying the invention.

In the following, an embodiment of the invention is described in detail referring to the drawings.

[Brief Description on Arrangement of Apparatus]

FIG. 1 is a perspective view showing an external appearance of a three-dimensional shape measuring apparatus embodying the invention to measure the three-dimensional shape of an object 10 to be measured. The three-dimensional shape measuring apparatus 20 is a so-called three-dimensional digitizer for obtaining three-dimensional data concerning the object 10 to be measured by using a light cutting method. FIG. 1 shows a cylindrical columnar member as an example of the object 10 to be measured. Actually, however, press molded articles, plastic molded articles, die casting articles, and like articles are objects to be measured.

The three-dimensional shape measuring apparatus 20 has a substantially rectangular parallelepiped housing with a built-in optical unit provided with a light emitter and a light receiver. A light projector 21 formed with a light projection window, as a light projecting section, and a light receiver 22 formed with a light receiving window, as an imaging section, are provided in the housing. The light projector 21 and the light receiver 22 are disposed away from each other by a predetermined distance depending on a baseline length.

As shown in FIG. 1, the light projector 21 emits slit light S, which is a laser beam flux irradiated in a horizontal direction. The slit light S is planar light which is irradiated with a radiation angle α in the horizontal direction i.e. with a fan-like shape, and has a width W in a vertical direction. The slit light S is projected toward the object 10 to be measured. When the projected slit light S is reflected on the surface of the object 10 to be measured, a part of the reflected light R is allowed to be incident onto the light receiver 22.

Figure 2:
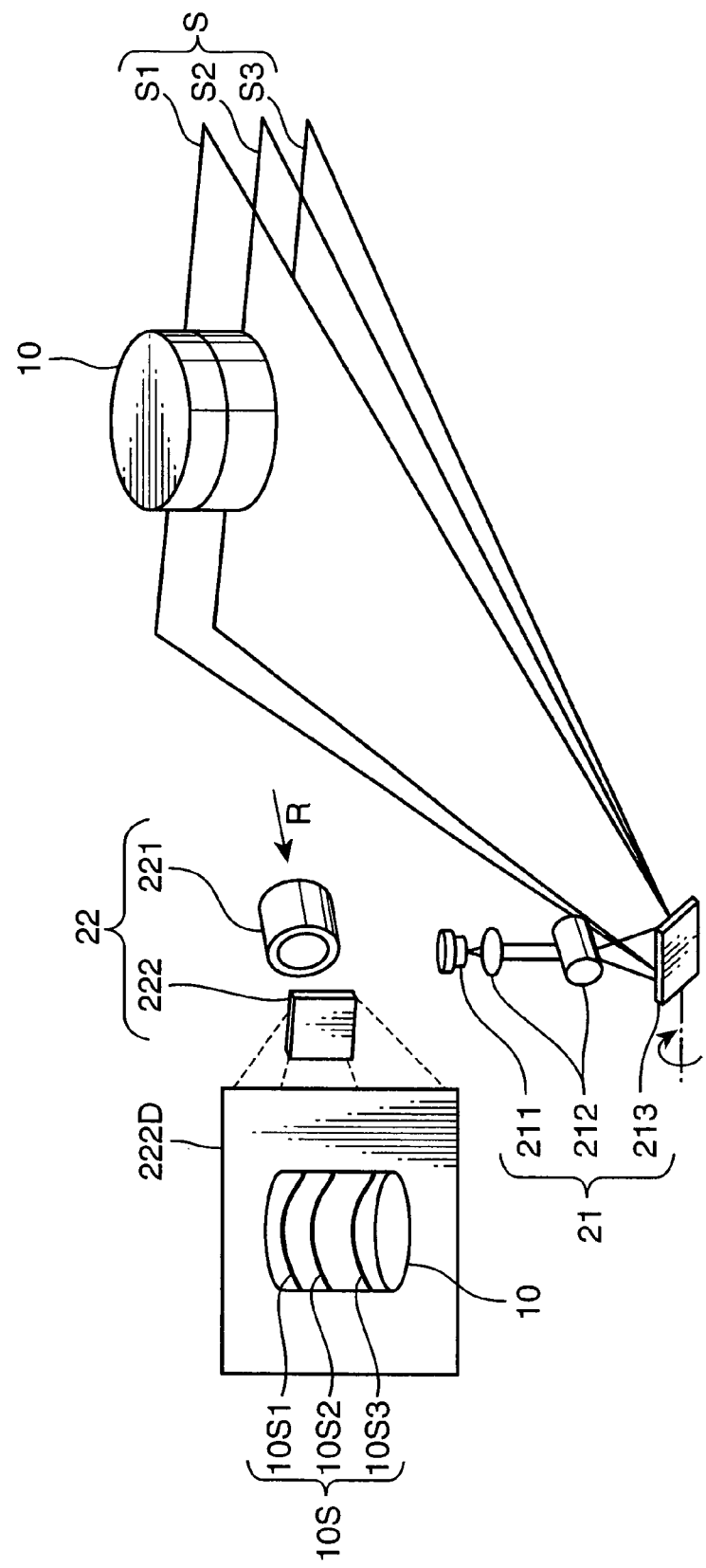
FIG. 2 is a schematic diagram showing a basic internal arrangement of the three-dimensional shape measuring apparatus.
Figure 3:
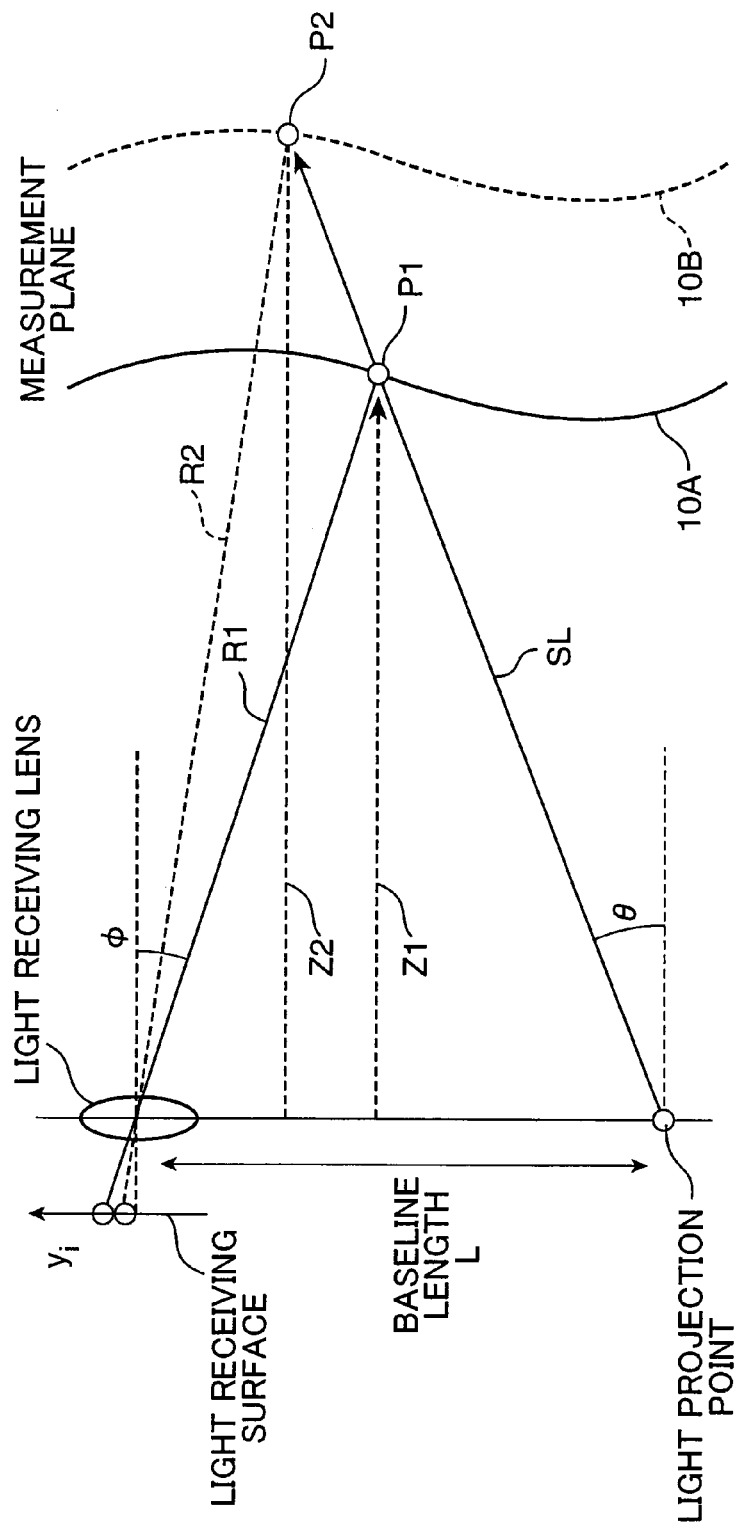
FIG. 3 is an explanatory diagram showing a principle of a three-dimensional shape measuring method to be executed by the three-dimensional shape measuring apparatus.

FIG. 2 is a schematic diagram showing a basic internal arrangement of the three-dimensional shape measuring apparatus 20, and FIG. 3 is an explanatory diagram showing a principle of a three-dimensional shape measuring method to be executed by the three-dimensional shape measuring apparatus 20. As shown in FIG. 2, the light projector 21 includes a laser light source 211 as a light source for generating laser light, a light projection optical system 212 for guiding the laser light to the light projection window, and a galvanometric mirror 213 which is rotated about a plane. The light receiver 22 includes a light receiving optical system 221 for receiving the reflected light R, and an image sensor 222 arranged on an optical path of the light receiving optical system 221. The image sensor 222 is provided with a CCD (Charge Coupled Device). The light receiver 22 has a predetermined measurement depth including a front position and a rear position with respect to a focus position, as measurement dimensions.

The light projector 21 is operated in such a manner that slit light S i.e. slit light beams S1, S2, and S3 are sequentially projected toward the object 10 to be measured by rotating the galvanometric mirror 213 by a predetermined rotation angle. The light projection is carried out to scan the entire area of the object 10 to be measured. The light reflected on the object 10 to be measured is received by the image sensor 222 via the light receiving optical system 221. An image 222D detected by the light receiving on the image sensor 222 includes slit images 10S1, 10S2, and 10S3 depending on a stereoscopic configuration of the object 10 to be measured. Then, a distance from the three-dimensional shape measuring apparatus 20 to the object 10 to be measured is calculated according to the triangulation by a data processor provided in the three-dimensional shape measuring apparatus 20, based on projection angles of the slit light beams S1, S2 and S3, and the positions of the slit images 10S1, 10S2, and 10S3 formed on a light receiving area of the image sensor 222.

Now, a measurement principle to be implemented in the embodiment is described referring to FIG. 3. First, a projection angle θ of a laser beam SL projected from a certain light projecting point is obtained based on the rotation angle of the galvanometric mirror 213. Assuming that the laser beam SL is reflected on a certain point P1 on a certain measurement plane 10A, and a reflected laser beam R1 is incident onto the light receiver 22, a light receiving angle φ of the reflected laser beam R1 is calculated based on an imaging position y1 of the reflected laser beam R1 which is detected on a light receiving surface of the image sensor 222. Then, a distance Z1 to the point P1 on the measurement plane 10A is derived based on the baseline length L between the light projecting point and the light receiving point, the light projection angle θ, and the light receiving angle φ. The calculation is also applied to a reflected laser beam R2 which is reflected on a certain point P2 on another measurement plane 10B. A distance Z2 to the point P2 on the measurement plane 10B is calculated in a similar manner as mentioned above.

[Brief Description on Focus Adjustment]

Figure 4:
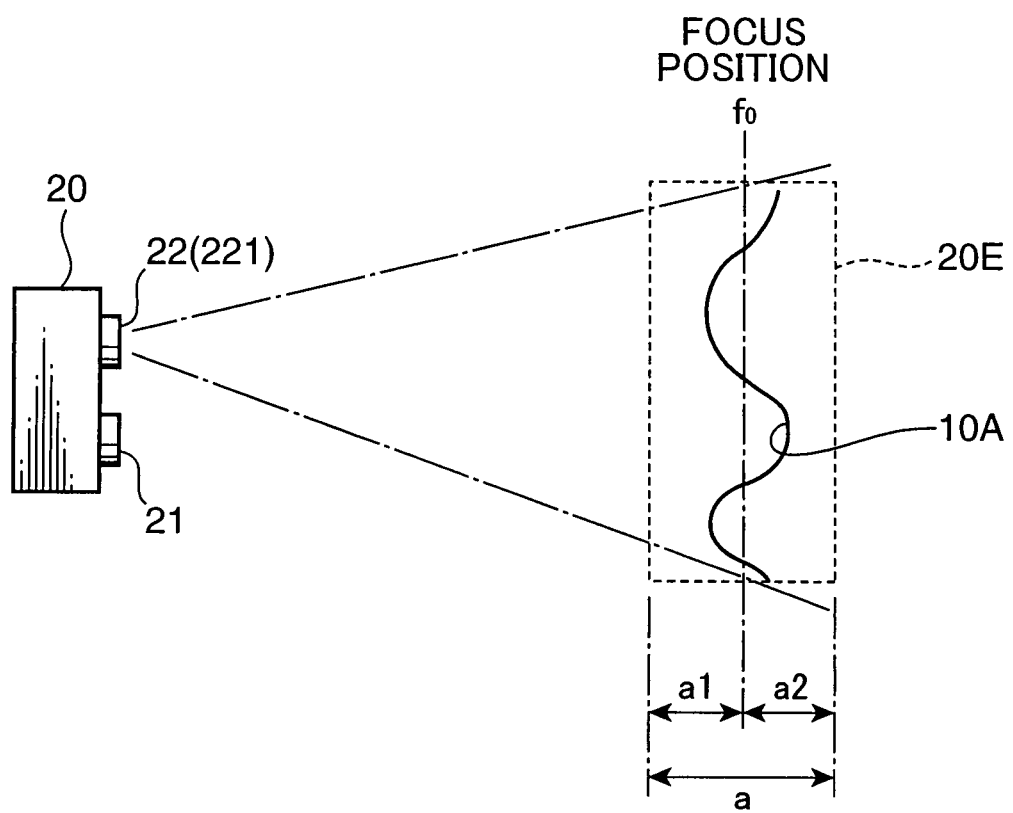
FIG. 4 is a schematic diagram for describing measurement dimensions of a light receiving section.

FIG. 4 is a schematic diagram for describing measurement dimensions 20E to be detected by the light receiver 22. As shown in FIG. 4, the measurement dimensions 20E includes a measurement depth "a" which is the sum of a front range "a1" having a certain length in a direction of the optical axis of the light receiving optical system 221, and a rear range "a2" having a certain length in the optical axis direction, with a focus position $f_0$ of the light receiving optical system 221 of the light receiver 22 serving as a reference position. The measurement dimensions 20E has a measurement width depending on an angle of view i.e. a focal length in a direction orthogonal to the optical axis. The focus position $f_0$ is a point having a highest contrast ratio. The front range "a1" and the rear range "a2" correspond to a depth of field of the light receiving optical system 221, which is a range capable of obtaining a contrast ratio for enabling measurement.

The measurement dimensions 20E i.e. the measurement depth "a" is fixedly defined by the focal length of the light receiving optical system 221, a lens F value, or the like. In the case where a three-dimensional shape of an object is actually measured, it is desirable to allow the depthwise dimension and the widthwise dimension of the measurement plane 10A to be included in the measurement dimensions 20E as much as possible, in the aspect of reducing the number of times of measurement and shortening the measurement time. In the case where an object to be measured has a projection or a recess whose depth is larger than the measurement depth "a" of the measurement dimensions 20E, or a widthwise dimension which is larger than a measurement range of the measurement dimensions 20E, generally, images obtained by performing an imaging operation multiple times i.e. by measuring a three-dimensional shape of the object to be measured are jointed to each other.

Considering the fact that it takes a time to perform the multiple imaging operations, or to joint the images, there is a demand for reducing the number of times of performing the imaging operation or the jointing operation as much as possible. Also, there is an additional demand for completing the three-dimensional shape measurement by a one-time imaging operation by properly adjusting the position of the measurement dimensions 20E, in place of imaging the object to be measured twice, if the projection or the recess of the object to be measured has a depth equal to or smaller than the measurement depth "a" in the optical axis direction. The embodiment of the invention satisfies the above demands. An approach as to how the demands are satisfied is described in the following, referring to FIGS. 5A through 9B.

Figure 5A:
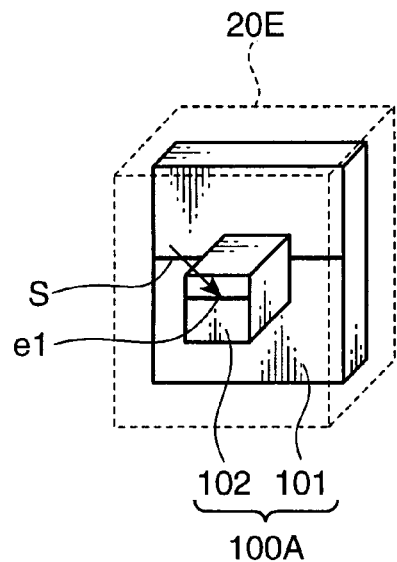
FIGS. 5A and 5B are schematic diagrams for describing an arrangement as to how the position of the measurement dimensions is set.
Figure 5B:
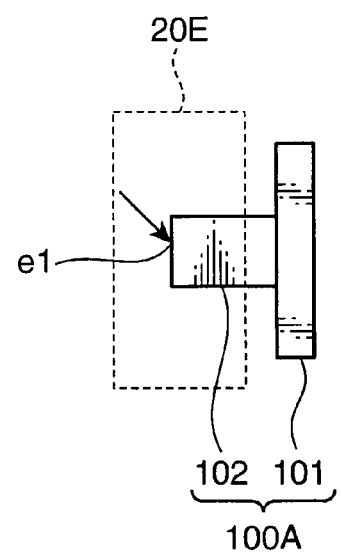

FIGS. 5A through 6B are schematic diagrams for describing an arrangement as to how the position of the measurement dimensions 20E is set, in other words, how a focal length is set in measuring the three-dimensional shape of an object 100A to be measured. The object 100A to be measured is formed by mounting a columnar projection 102 on a flat plate member 101. FIGS. 5A and 5B show a state that slit light S is irradiated onto the object 100A to be measured, a top surface of the columnar projection 102 is selected as an AF-metering point e1, and the position of the measurement dimensions 20E is set relative to the object 100A to be measured. As shown in FIG. 5B, in the position setting, the flat plate member 101 is located out of the measurement dimensions 20E. In this condition, it is required to perform the position setting by shifting the measurement dimensions 20E in such a manner that the flat plate member 101 is included in the measurement dimensions 20E, and to measure the three-dimensional shape of the object 100A to be measured again, after the measurement in the state shown in FIGS. 5A and 5B is conducted, in order to measure the three-dimensional shape of the entirety of the object 100A to be measured.

Figure 6A:
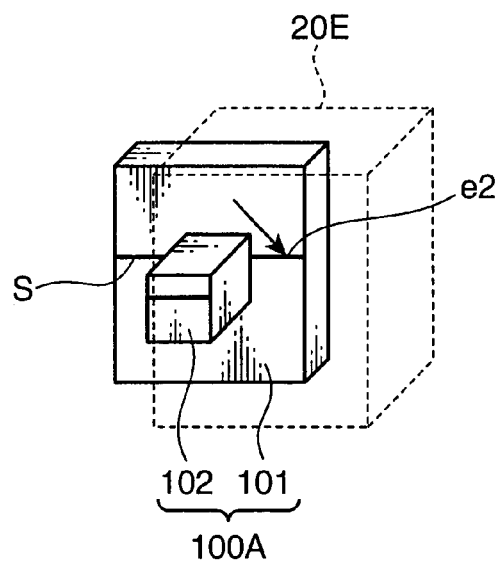
FIGS. 6A and 6B are schematic diagrams for describing another arrangement as to how the position of the measurement dimensions is set.
Figure 6B:
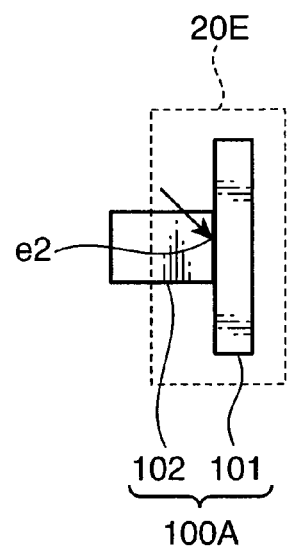

FIGS. 6A and 6B show a state that a surface of the flat plate member 101 is selected as an AF-metering point e2, and the position of the measurement dimensions 20E is set. As shown in FIG. 6B, in the position setting, a distal end of the columnar projection 102 is located out of the measurement dimensions 20E. In this condition, it is required to perform the position setting by shifting the measurement dimensions 20E in such a manner that the distal end of the columnar projection 102 is included in the measurement dimensions 20E, and to measure the three-dimensional shape of the object 100A to be measured again, after the measurement in the state shown in FIGS. 6A and 6B is conducted, in order to measure the three-dimensional shape of the entirety of the object 100A to be measured.

Figure 7A:
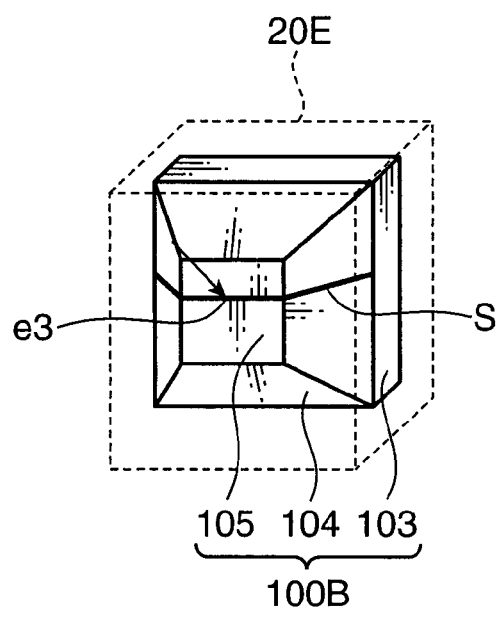
FIGS. 7A and 7B are schematic diagrams for describing another arrangement as to how the position of the measurement dimensions is set.
Figure 7B:
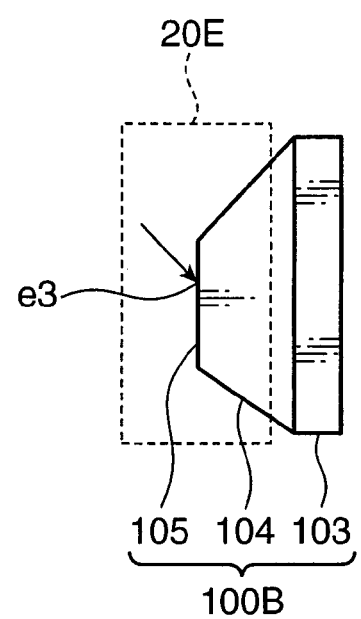

FIGS. 7A and 7B are schematic diagrams for describing another arrangement as to how the position of the measurement dimensions 20E is set in measuring a three-dimensional shape of an object 100B to be measured. The object 100B to be measured is formed by mounting a prismatic member with four slopes 104 and a top surface 105 on a flat plate member 103. FIGS. 7A and 7B show a state that slit light S is irradiated onto the object 100B to be measured, the top surface 105 is selected as an AF-metering point e3, and the position of the measurement dimensions 20E is set. As shown in FIG. 7B, in the position setting, a skirt portion of the slopes 104 is located out of the measurement dimensions 20E. In this condition, it is required to perform the position setting by shifting the measurement dimensions 20E in such a manner that the skirt portion of the slopes 104 is included in the measurement dimensions 20E, and to measure the three-dimensional shape of the object 100B to be measured again, after the measurement in the state shown in FIGS. 7A and 7B is conducted, in order to measure the three-dimensional shape of the entirety of the object 100B to be measured.

Figure 8A:
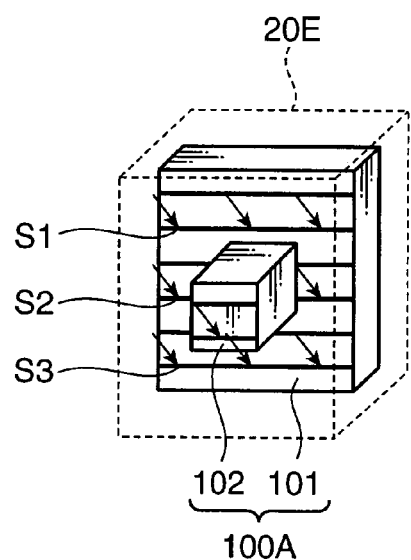
FIGS. 8A and 8B are schematic diagrams for describing another arrangement as to how the position of the measurement dimensions is set.

FIGS. 8A through 9B are schematic diagrams for briefly describing a position adjustment technique concerning the measurement dimensions 20E i.e. a focus adjusting method, as an embodiment of the invention. FIGS. 8A and 8B are diagrams for describing an arrangement as to how the position of the measurement dimensions 20E is set in the case where the three-dimensional shape of an object 100A to be measured similar to the objects to be measured shown in FIGS. 5A through 6B is measured. According to the focus adjusting method of the embodiment, plural points shown by the arrows in FIGS. 8A and 8B are selected as AF-metering points among slit light beams S1, S2, and S3 to be irradiated onto the object 100A to be measured, and distance information concerning the object 100A to be measured is obtained based on the multi-points.

Figure 8B:
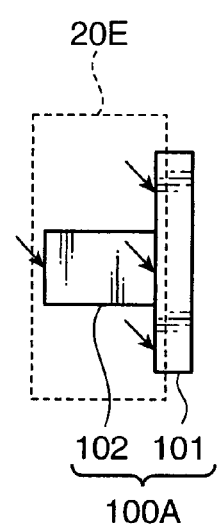

The position adjustment to optimize the measurement dimensions 20E i.e. the measurement depth "a" is performed based on the distance information. Specifically, as shown in FIG. 8B, a focal length i.e. a focus position is adjusted in such a manner that the surface of the flat plate member 101 and the top surface of the columnar projection 102 are included in the measurement dimensions 20E, in other words, points on the object 100A to be measured which are closest to and farthest from the three-dimensional shape measuring apparatus 20 within the distance information, are included in the measurement depth, depending on the shape of the object 100A to be measured which is estimated based on the distance information. With this arrangement, measurement on the three-dimensional shape of the object 100A to be measured can be completed by a one-time measurement.

Figure 9A:
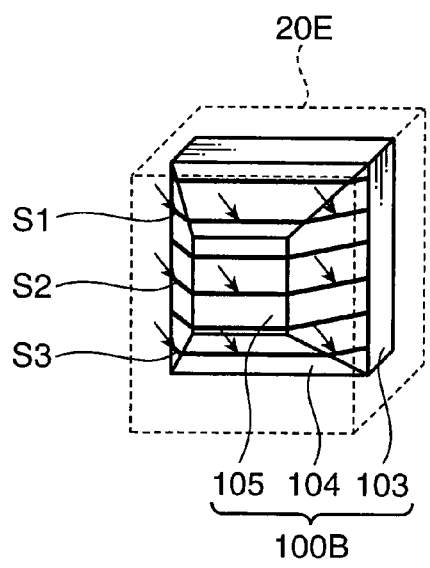
FIGS. 9A and 9B are schematic diagrams for describing another arrangement as to how the position of the measurement dimensions is set.
Figure 9B:
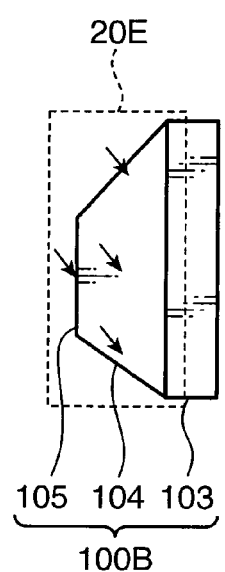

FIGS. 9A and 9B are diagrams showing another arrangement as to how the position of the measurement dimensions 20E is set in measuring the three-dimensional shape of an object 100B to be measured similar to the object 100B to be measured shown in FIGS. 7A and 7B. Similarly to the arrangement in FIGS. 8A and 8B, plural points on the object 100B to be measured, which are indicated by the arrows in FIGS. 9A and 9B, are selected as AF-metering points among silt light beams S1, S2, and S3 to be irradiated onto the object 100B to be measured, and distance information concerning the object 100B to be measured is obtained based on the multi-points. Then, the position adjustment to optimize the measurement dimensions 20E i.e. the measurement depth "a" is performed based on the distance information. Specifically, as shown in FIG. 9B, a focal length is adjusted in such a manner that the slopes 104 and the top surface 105 are included in the measurement dimensions 20E. With this arrangement, measurement of the three-dimensional shape of the object 100B to be measured can be completed by a one-time measurement.

[Brief Description on Electric Configuration]

Figure 10:
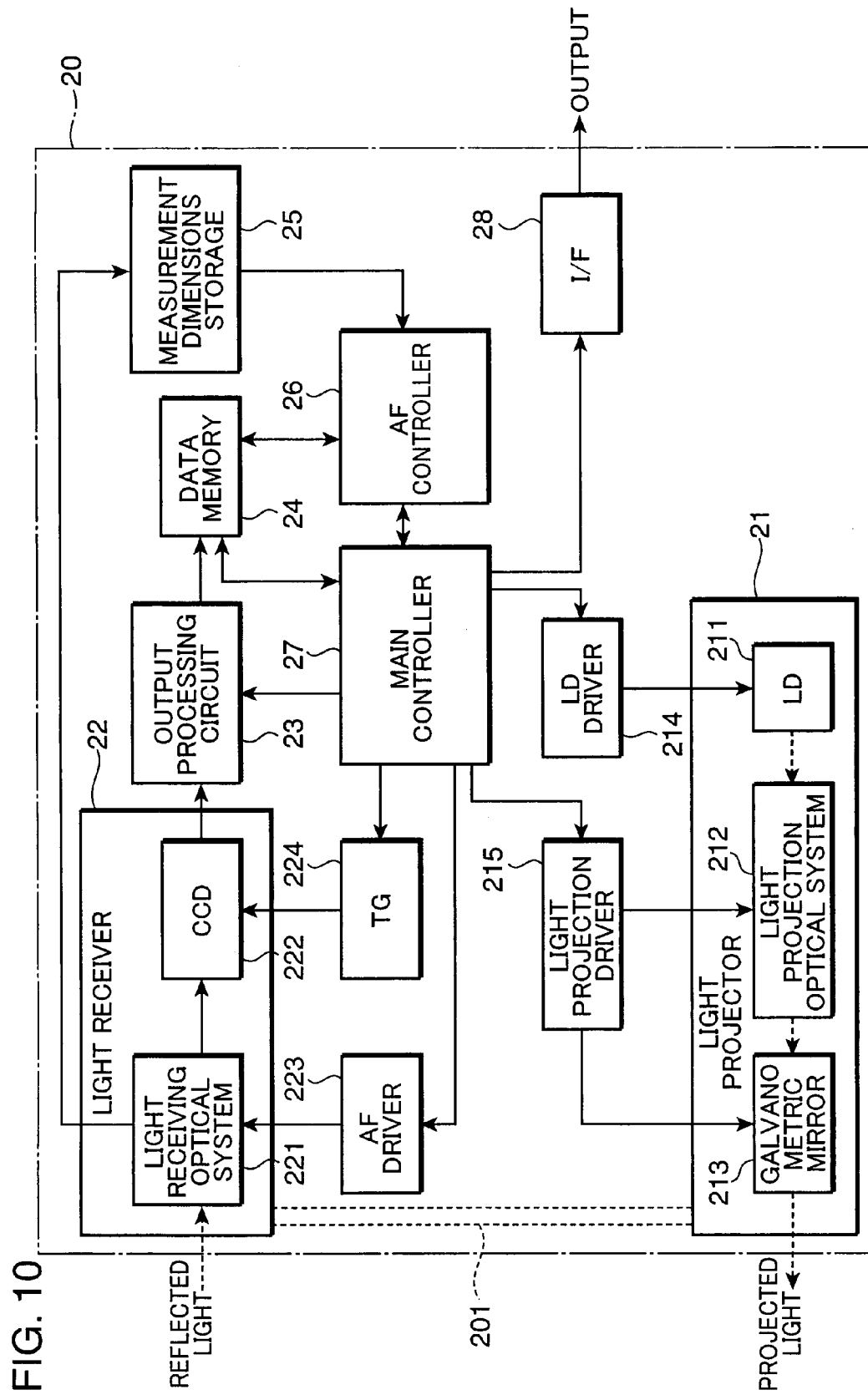
FIG. 10 is a block diagram showing an electric configuration of the three-dimensional shape measuring apparatus.

In this section, an arrangement for realizing the position adjustment of the measurement dimensions 20E as shown in FIGS. 8A through 9B is described. FIG. 10 is a block diagram showing an electric configuration of the three-dimensional shape measuring apparatus 20. The three-dimensional shape measuring apparatus 20 includes an LD driver 214 and a light projection driver 215 which belong to the light projector 21, an AF driver 223 and a timing generator (TG) 224 which belong to the light receiver 22, an output processing circuit 23, a data memory 24, a measurement dimensions storage 25, an AF (auto-focus) controller 26, a main controller 27, and an I/F (interface) 28.

The light projector 21 includes the laser light source 211, the light projection optical system 212, and the galvanometric mirror 213, and outputs slit light, which is a laser beam flux irradiated in a horizontal direction. The slit light is planar light which is irradiated with a predetermined radiation angle in the horizontal direction i.e. with a fan-like shape, and has a certain width in a vertical direction. The LD driver 214 drives the laser light source 211 constituted of a laser diode or a like device for generating slit laser beams based on a drive control signal issued from the main controller 27 by light intensity modulation such as on-off control or brightness-darkness control. The light projection driver 215 drives lens elements constituting the light projection optical system 212 for focus/zoom control, and drives the galvanometric mirror 213 to rotate, based on a control signal issued from the main controller 27. Thereby, the light projector 21 is allowed to project the slit light for scanning the object to be measured under the control of the main controller 27.

Figure 12A:
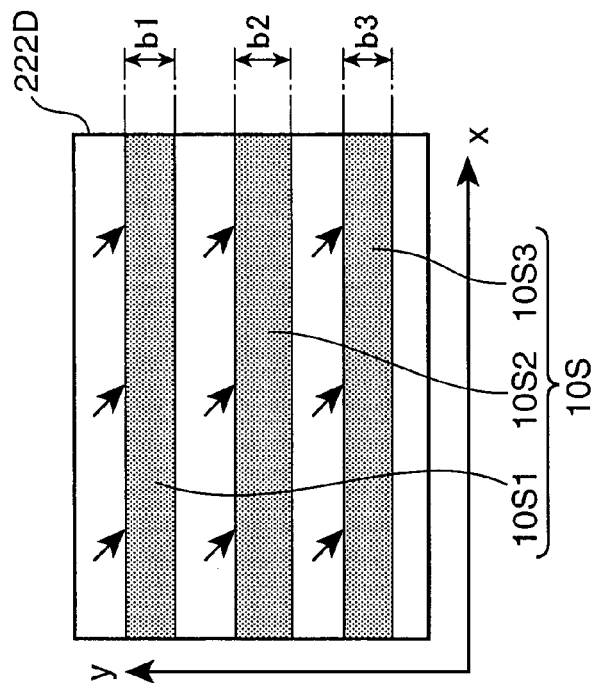
FIGS. 12A and 12B are schematic diagrams for describing a manner as to how slit light beams emitted from a light projector are projected to scan a measurement plane.
Figure 12B:
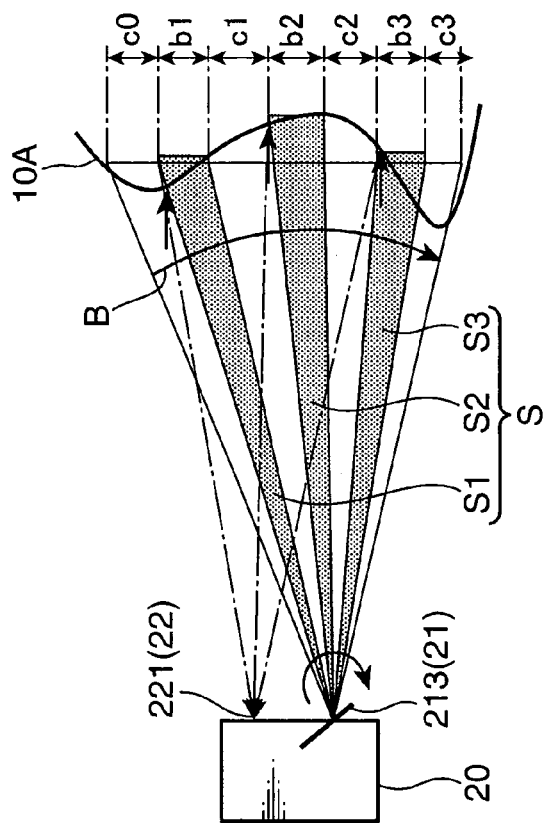

FIGS. 12A and 12B are diagrams for describing a manner as to how slit light beams emitted from the light projector 21 is projected to scan the measurement plane 10A. As shown in FIG. 12A, the slit light flux S is irradiated from the laser light source 211 onto the object 10 to be measured via the galvanometric mirror 213 which is drivingly rotated by the light projection driver 215. In this embodiment, the laser light source 211 is turned on and off with a predetermined cycle. The portions indicated by the symbols b1, b2, and b3 in FIGS. 12A and 12B correspond to periods when the laser light source 211 is turned on, and correspond to projection areas where the slit light beams S1, S2, and S3 are respectively projected. On the other hand, the portions indicated by the symbols c0, c1, c2, and c3 in FIG. 12A correspond to periods when the laser light source 211 is turned off. Specifically, the slit light beams S1, S2, and S3 are irradiated onto the object 10 to be measured in the direction shown by the arrow B in FIG. 12A. Each of the slit laser beams itself emitted from the laser light source 211 is a light beam of a narrow width corresponding to about five pixels in terms of pixels of the image sensor 222. However, when the slit light flux S is projected for scanning by the periods corresponding to the symbols b1, b2, and b3 by rotation of the galvanometric mirror 213, each of the slit light beams S1, S2, and S3 is allowed to have a certain width.

FIG. 12B shows an image 222D detected by the image sensor 222 when the slit light beams S1, S2, and S3 are irradiated. The image sensor 222 is exposed for a period (about 0.1 to several seconds) when the galvanometric mirror 213 is rotated. As a result of the exposure, slit images 10S1, 10S2, and 10S3 corresponding to the projection areas by the slit light beams S1, S2, and S3 are detected, respectively.

Figure 13:
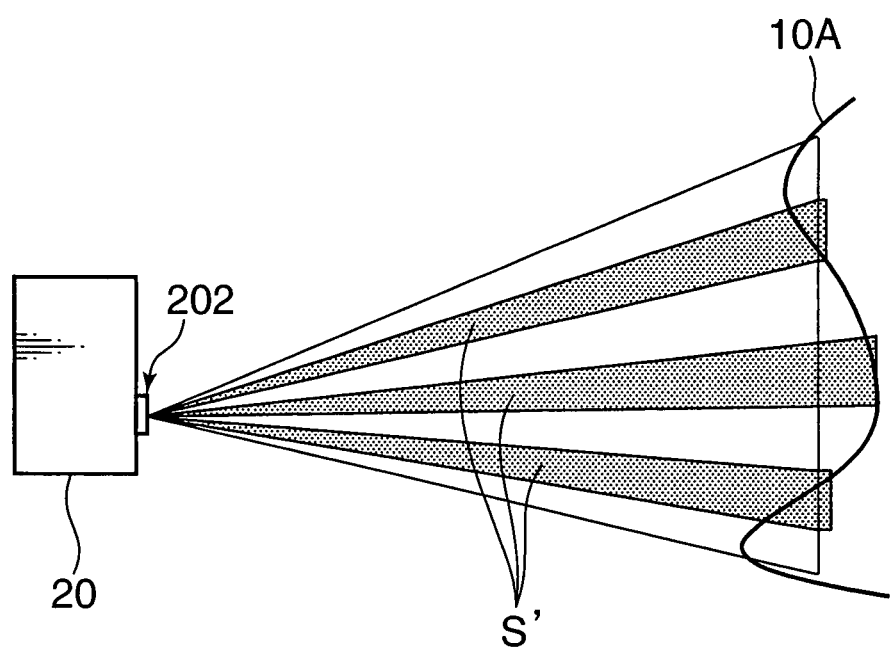
FIG. 13 is a schematic diagram showing a manner as to how pattern light is projected from a three-dimensional shape measuring apparatus provided with a pattern mask.

Alternatively, pattern light may be projected onto the object 10A to be measured by using a pattern mask, in place of performing the aforementioned pattern light projection based on scanning projection. FIG. 13 is a schematic diagram showing a pattern light projection to be executed by a three-dimensional shape measuring apparatus 20 provided with a pattern mask 202. In the modification, a light source such as a halogen lamp is used, and a slit light flux S' is projected onto the measurement plane 10A by projecting light through the pattern mask 202 having a slit configuration. Examples of the pattern mask 202 include a mechanical grid mask and a liquid crystal panel capable of forming a light projection pattern. With use of these pattern masks, pattern light projection similar to the arrangement shown in FIGS. 12A and 12B can be performed. In the modification, the image sensor 222 is exposed simultaneously by the measurement plane 10A where the light projection pattern is projected, without being exposed when the slit light flux S scans the measurement plane 10A, as in the scanning projection shown in FIGS. 12A and 12B.

Referring back to FIG. 10, as mentioned above, the light receiver 22 includes the light receiving optical system 221 and the image sensor 222, and is constructed in such a manner that a part of the slit light reflected on the surface of the object 10 to be measured is incident onto the light receiver 22. The light receiving optical system 221 includes a certain number of taking lens elements, a diaphragm, and a lens moving mechanism for moving the lens elements for a focusing or zooming operation. The AF driver 223 includes a stepping motor, and drives the taking lens elements of the light receiving optical system 221 for a focusing or zooming operation under the control of the main controller 27 and the AF controller 26. The aforementioned position adjustment of the measurement dimensions 20E is realized when the AF driver 223 drives the light receiving optical system 221, or alternatively may be realized by moving the image sensor 222 in the optical axis direction of the taking lens elements.

The image sensor 222 generates two-dimensional image data concerning the object 10 to be measured by photoelectrically converting a light image of the object 10 to be measured which is formed by the light receiving optical system 221. Examples of the image sensor 222 include a CCD color area sensor and a C-MOS color area sensor of a Bayer arrangement, wherein a number of photoelectric conversion elements constituted of e.g. photodiodes are arranged two-dimensionally in a matrix, and color filters having different spectral characteristics of e.g. R (red), G (green), and B (blue) are attached to the light receiving surfaces of the photoelectric conversion elements with a ratio of 1:2:1.

The timing generator 224 generates a timing pulse for controlling an imaging operation by the image sensor 222 e.g. a charge accumulation based on exposure or a readout operation of the accumulated charge. For instance, the timing generator 224 generates a vertical transfer pulse, a horizontal transfer pulse, a charge sweep pulse, and the like based on an imaging control signal issued from the main controller 27 to drive the image sensor 222.

The output processing circuit 23 applies a predetermined signal processing to an image signal outputted from the image sensor 222 i.e. an analog signal group indicating light receiving on the pixels of the CCD area sensor, and converts the analog image signal into a digital signal for outputting the digital signal. The output processing circuit 23 includes a CDS (correlation double sampling) circuit for reducing a reset noise included in the analog image signal, an AGC (automatic gain control) circuit for correcting the level of the analog image signal, and an analog-to-digital conversion circuit for converting the analog image signal into a digital image signal i.e. image data of e.g. 14 bits.

The data memory 24 includes an RAM (Random Access Memory), and temporarily stores various data therein. For instance, the data memory 24 temporarily stores two-dimensional image data for AF control which has been outputted from the output processing circuit 23 and for actual measurement which has been acquired concerning the object 10 to be measured, and the like.

The measurement dimensions storage 25 stores information relating to the measurement dimensions, which is acquired by the light receiving optical system 221 of the light receiver 22. Specifically, the measurement dimensions storage 25 stores coordinate information concerning the measurement dimensions 20E in xyz-axes directions as shown in FIG. 4. The measurement depth "a" extends in the z-axis direction. The coordinate information is utilized as basic information in performing the position adjustment of the measurement dimensions 20E by the AF controller 26.

The AF controller 26 performs auto-focus processing with respect to the light receiving optical system 21 depending on the shape of the object 10 to be measured to perform the position adjustment of the measurement dimensions 20E prior to an imaging operation for actual measurement. The function of the AF controller 26 will be described later in detail referring to FIG. 11.

The main controller 27 has a CPU (Central Processing Unit), and controls operations of the various components of the three-dimensional shape measuring apparatus 20. Specifically, the main controller 27 controls the light projector 21 to project slit light, controls the AF driver 223 to drive the light receiving optical system 221, controls the timing generator 224 to generate a timing pulse, controls the output processing circuit 23 to apply a predetermined processing to a signal, and controls the data memory 24 to record data therein.

The I/F 28 is an interface for enabling data communication with an external device such as a personal computer. Two-dimensional image data or like data concerning the object 10 to be measured, which has been temporarily stored in the data memory 24, is transmitted to the personal computer via the I/F 28.

The light projector 21 and the light receiver 22 are securely fixed to each other by a mechanical fixing member 201 (see FIG. 10) to keep the light projector 21 and the light receiver 22 from being displaced one from the other. The fixation is provided because the distance between the light projector 21 and the light receiver 22 serves as a baseline length in performing triangulation.

[Detailed Description on AF Controller]

Figure 11:
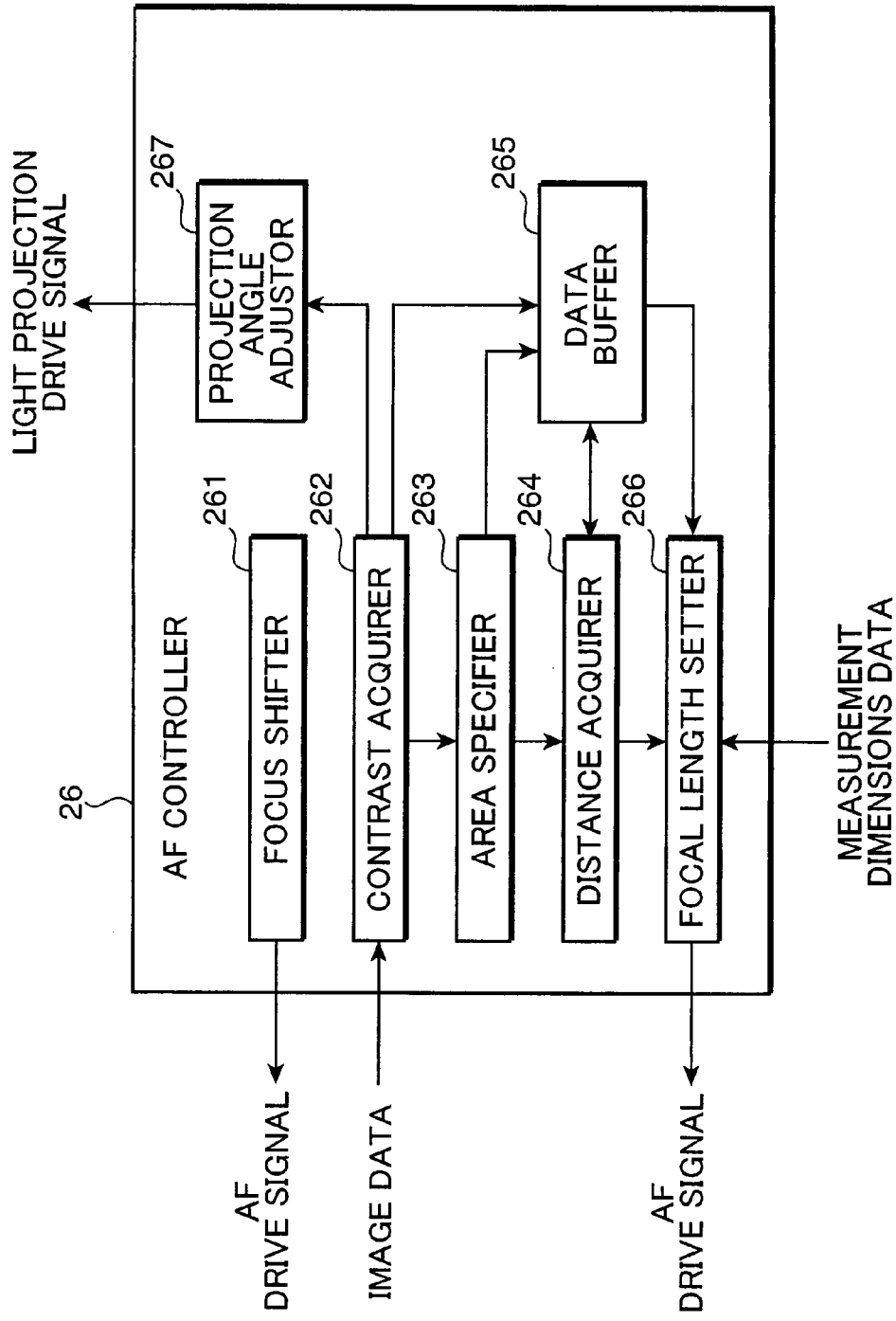
FIG. 11 is a functional block diagram showing a function arrangement of an AF controller as a control calculator.

FIG. 11 is a functional block diagram showing a functional arrangement of the AF controller 26 as a control calculator. The AF controller 26 includes a focus shifter 261, a contrast acquirer 262 as a contrast deriving section, an area specifier 263, a distance acquirer 264 as a distance deriving section, a data buffer 265, a focal length setter 266 as a measurement dimensions adjuster, and a projection angle adjuster 267.

The focus shifter 261 generates, in performing AF control, a control signal for shifting a focal length in accordance with a predetermined sequence so that the light projector 21 is controlled to cyclically project slit light onto the object 10 to be measured for acquiring a two-dimensional image i.e. distance measuring data concerning the object 10 to be measured a certain number of times, with the focal length being changed each time the slit light is projected. The control signal is supplied to the AF driver 223 as an AF drive signal via the main controller 27.

The contrast acquirer 262 obtains e.g. a maximum luminance Lmax and a minimum luminance Lmin with respect to each of plural areas of the two-dimensional image detected by the image sensor 222 e.g. areas obtained by equally dividing the light receiving surface of the image sensor, and calculate a contrast ratio i.e. an imaging contrast by the below-mentioned formula.

$$\text{contrast ratio}=(Lmax-Lmin)/(Lmax+Lmin)$$

By implementing the calculation, an approximate distance with respect to each of the areas of the two-dimensional image is obtained. The contrast ratio is obtained with respect to each of the two-dimensional images acquired by changing the focal length.

In this embodiment, the light projector 21 projects pattern light by scanning projection with use of the galvanometric mirror 213. If on-off operations of the slit laser beams emitted from the laser light source 211 are performed at a significantly short interval, the imaging contrast on each of the areas can be assessed, using the contrast ratio obtained based on the maximum luminance Lmax and the minimum luminance Lmin. However, if the on-off operations of the slit laser beams are performed at a significantly long interval, the assessment by the aforementioned method may be difficult or impossible, because the image sensor 222 is exposed when the slit laser beams pass through the corresponding pixels.

Figure 14A:
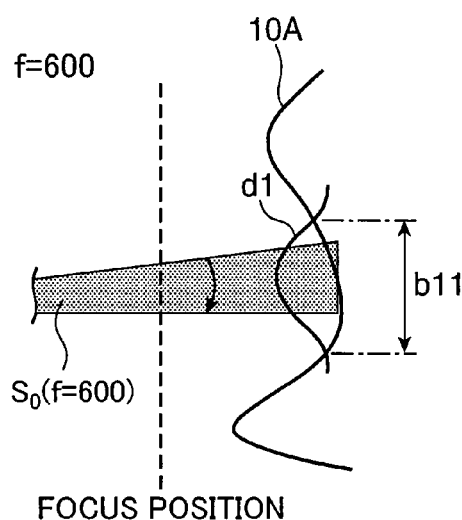
FIGS. 14A and 14B are diagrams schematically showing a relation between a focus condition of a slit laser beam $S_0$ emitted from a laser light source, and a histogram of the slit laser beam $S_0$.
Figure 14B:
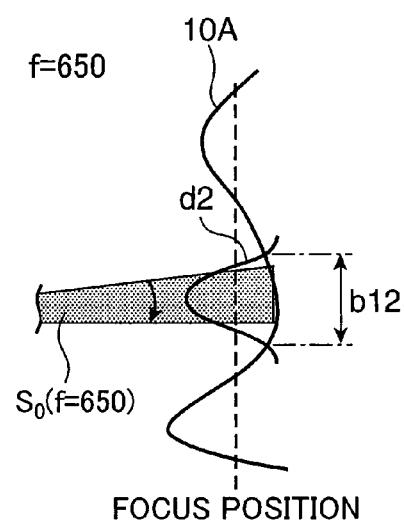

FIGS. 14A and 14B are schematic diagrams showing a relation between a focus condition of a slit laser beam $S_0$ emitted from the laser light source 211, and a histogram of the slit laser beam $S_0$. As shown in FIG. 14A, in the case where the measurement plane 10A is located far from a focus position, the slit laser beam $S_0$ is received in an out-of-focus state. Accordingly, the slit laser beam $S_0$ has a broad histogram d1. In other words, the pixel width b11 which is exposed in one unit of slit laser beam $S_0$ is relatively large. On the other hand, as shown in FIG. 14B, in the case where the measurement plane 10A is located near the focus position, the slit laser beam $S_0$ is received in a focused state. Accordingly, the slit laser beam $S_0$ has a narrow histogram d2. In other words, the pixel width b12 which is exposed in one unit of slit laser beam $S_0$ is relatively small.

Figure 15A:
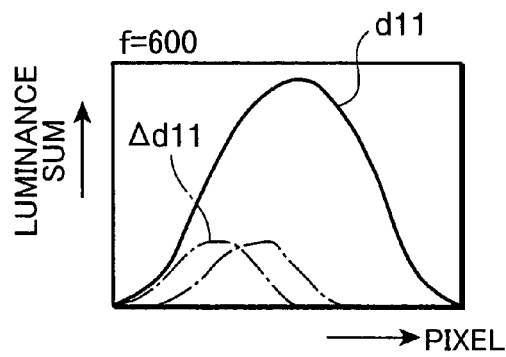
FIGS. 15A and 15B are graphs showing a luminance sum distribution concerning one projection area where slit light S formed by scanning of the slit laser beam $S_0$ shown in FIGS. 14A and 14B is projected.
Figure 15B:
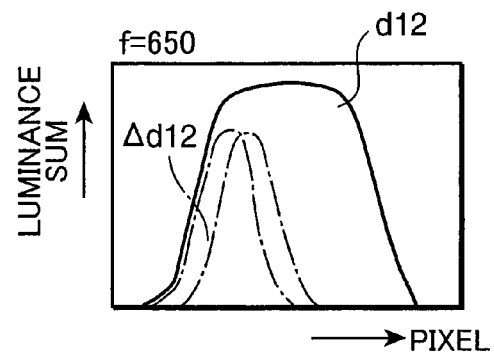

FIGS. 15A and 15B are graphs each showing a luminance sum distribution concerning one projection area where the slit light S i.e. one of the slit light beams S1, S2, and S3 shown in FIG. 12A is projected. The projection area is formed by scanning of the slit laser beam $S_0$ as shown in FIGS. 14A and 14B. In the case where the unit slit laser beam $S_0$ having the broad histogram as shown in FIG. 14A scans the projection area, the projection of the slit laser beam $S_0$ has a luminance sum distribution d11 as shown in FIG. 15A. Specifically, the unit histogram $\Delta d11$ obtained by irradiation of the unit slit laser beam $S_0$ having the broad histogram is sequentially integrated along the axis of abscissas i.e. in the pixel array direction, as the scanning is proceeded. As a result of the integration, the luminance sum distribution d11 has a curve with a moderate rising.

On the other hand, in the case where the unit slit laser beam $S_0$ having the narrow histogram as shown in FIG. 14B scans the projection area, the projection of the slit laser beam $S_0$ has a luminance sum distribution d12 as shown in FIG. 15B. Specifically, the unit histogram $\Delta d12$ obtained by irradiation of the unit slit laser beam $S_0$ having the narrow histogram is sequentially integrated along the axis of abscissas, as the scanning is proceeded. As a result of the integration, the luminance sum distribution d12 has a curve with a sharp rising.

Comparing the luminance sum distribution d11 and the luminance sum distribution d12, since the integration values of the unit histograms $\Delta d11$ and $\Delta d12$ are the same, the maximum values of the unit histograms $\Delta d11$ and $\Delta d12$ are substantially identical to each other. In this condition, it is difficult to assess the contrast based on the maximum values or the integration values of the luminance sums. However, as is obvious from FIGS. 15A and 15B, the luminance sum distributions d11 and d12 show a conspicuous difference in the degree of rising of the curve. In view of this, it is possible to assess the contrast by e.g. performing a differential processing with respect to the luminance sum distributions d11 and d12 and calculating degrees of rising of the curves in the luminance sum distributions.

Referring back to FIG. 11, the area specifier 263 specifies a high contrast area where the imaging contrast exceeds a predetermined threshold value, based on the calculation result of the imaging contrast obtained by the contrast acquirer 262. The calculation of the imaging contrast by the contrast acquirer 262 is implemented multiple times by changing the focal length. It should be noted, however, that the calculation may be performed only once if the object to be measured is a flat article. The area specifier 263 specifies the high contrast area with respect to each of the two-dimensional images acquired by the multiple imaging operations.

The distance acquirer 264 calculates and obtains accurate distance information by triangulation with respect to the high contrast areas specified by the area specifier 263. The principle on the distance calculation has been described as above referring to FIG. 3. The distance calculation by the distance acquirer 264 may be performed each time a high contrast area is specified concerning one two-dimensional image acquired with one focal length, or may be performed by specifying high contrast areas with respect to all the two-dimensional images acquired by changing the focal length, and integrating distance information concerning the specified high contrast areas.

The data buffer 265 temporarily stores the imaging contrast calculation results obtained by the contrast acquirer 262, the distance calculation results obtained by the distance acquirer 264, and the like.

The focal length setter 266 performs a position adjustment of the measurement dimensions 20E with respect to the object to be measured, based on the distance calculation results obtained by the distance acquirer 264. Specifically, the focal length setter 266 sets a focal length of the light receiving optical system 221 in such a manner that the measurement dimensions 20E is optimized depending on the shape of the object to be measured which is estimated based on multi-point distance information concerning the object to be measured, which has been obtained by triangulation e.g. in such a manner that points on the object to be measured which are closest to and farthest from the three-dimensional shape measuring apparatus 20 within the measurement dimensions 20E are included in the measurement depth.

The projection angle adjuster 267 adjusts the projection angle of slit light to be emitted from the light projector 21 for scanning the object to be measured. Specifically, the projection angle adjuster 267 outputs, to the light projection driver 215, a light projection drive signal for controlling the rotation angle of the galvanometric mirror 213. The operation of the projection angle adjuster 267 will be described later referring to FIG. 23. In the following, the contrast acquisition, the distance acquisition, and the position adjustment of the measurement dimensions 20E are described by taking examples.

Figure 16A:
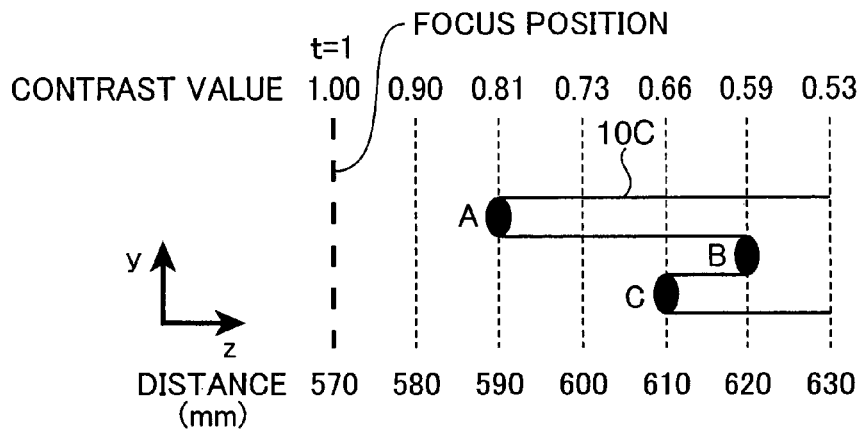
FIGS. 16A through 16C are schematic diagrams showing an approach for calculating an imaging contrast and specifying a high contrast area.
Figure 16B:
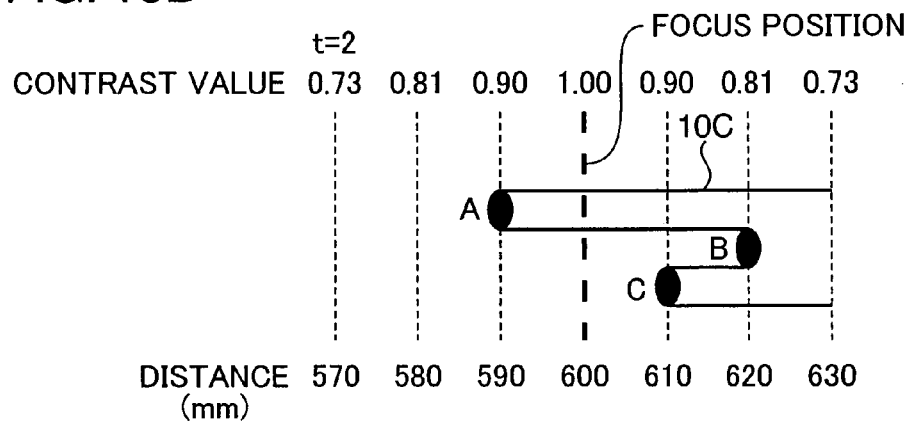
Figure 16C:
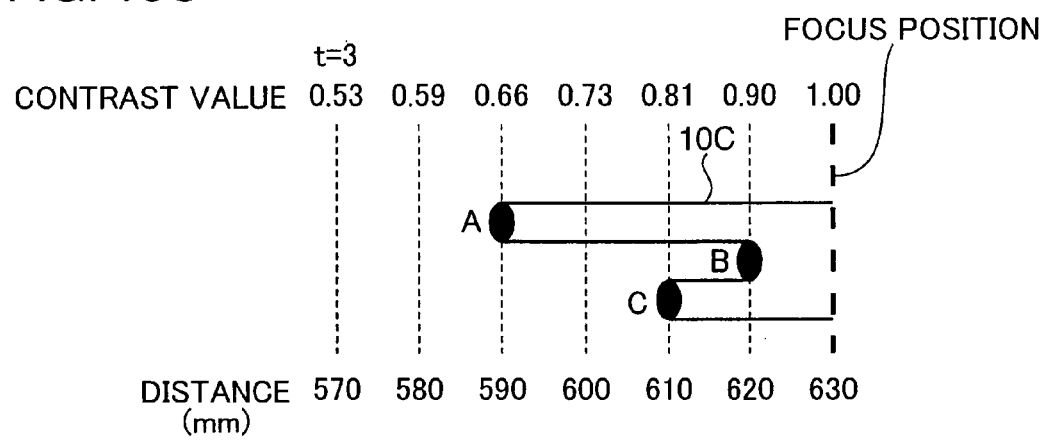

FIGS. 16A through 16C are diagrams showing an approach for calculating an imaging contrast and specifying a high contrast area. The approach is described based on premises that: specific areas A, B, and C of an object 10C to be measured are distanced from the light receiver 22 of the three-dimensional shape measuring apparatus 20 by 590 mm, 620 mm, and 610 mm, respectively; the focal length is changed in three steps i.e. the step t=1 through 3 where the initial focal length (t=1) is 570 mm from the light receiver 22; and the focal length is shifted by 30 mm in a one-time shift.

The contrast value is assessed as follows. A scale is adopted, in which the contrast value at the focus position is set to 1.00, and the contrast value is lowered by 10% relative to the contrast value at the focus position, each time the focal length is shifted from the focus position by 10 mm. A threshold value for determining a high contrast area is set to 0.90. The contrast value is obtained by the contrast acquirer 262, based on the contrast ratio obtained e.g. based on the maximum luminance Lmax and the minimum luminance Lmin, or a ratio of differential value concerning the luminance sum distributions described referring to FIGS. 15A and 15B, or the like. In the case where the contrast value of each of the areas A, B, and C exceeds 0.90 in the step t=1 through 3, detailed distances are calculated by triangulation. Also, an average of the contrast values is obtained with respect to each of the images obtained when the step t=1 through 3. If there is detected a focal length shift where the average contrast value exceeds 0.90, the focal length after the focal length shift is defined as an approximate focus position. If there is not detected a focal length shift where the average contrast value exceeds 0.90, the focal length having a peak value is defined as the approximate focus position.

FIG. 16A shows an imaging contrast calculation result in a condition that the focal length i.e. the focus position is set to 570 mm corresponding to the step t=1. The contrast values on the areas A, B, and C are respectively 0.81, 0.59, and 0.66, and the average contrast value is 0.69. In the step t=1, the contrast value on any of the areas A, B, and C does not exceed the threshold value for determining a high contrast i.e. 0.90. In this case, the area specifier 263 determines that any of the areas A, B, and C is not subjected to triangulation. Further, the average contrast value on the areas A, B, and C does not exceed the threshold value of 0.90. Accordingly, it is judged that the focal length in this condition does not correspond to the approximate focus position.

FIG. 16B shows an imaging contrast calculation result in a condition that the focal length is set to 600 mm corresponding to the step t=2. In this condition, the contrast values on the areas A, B, and C are respectively 0.90, 0.81, and 0.90, and the average contrast value is 0.87. In the step t=2, the contrast values on the areas A and C satisfy the requirement on the threshold value of 0.90. Accordingly, the area specifier 263 determines that the areas A and C are subjected to triangulation based on the two-dimensional image obtained in the step t=2. However, the average contrast value on the areas A, B, and C does not exceed the threshold value of 0.90. Accordingly, it is judged that the focal length in this condition does not correspond to the approximate focus position.

FIG. 16C shows an imaging contrast calculation result in a condition that the focal length is set to 630 mm corresponding to the step t=3. In this condition, the contrast values on the areas A, B, and C are respectively 0.66, 0.90, and 0.81, and the average contrast value is 0.79. In the step t=3, the contrast value on the area B satisfies the requirement on the threshold value of 0.90. Accordingly, the area specifier 263 determines that the area B is subjected to triangulation based on the two-dimensional image obtained in the step t=3. However, the average contrast value on the areas A, B, and C does not exceed the threshold value of 0.90. Accordingly, it is judged that the focal length in this condition does not correspond to the approximate focus position. In this example, all the average contrast values in the conditions corresponding to the step t=1 through 3 do not exceed the threshold value of 0.90. Accordingly, the approximate focus position is defined based on a peak value of the average contrast values. In this example, the focal length of 600 mm corresponding to the step t=2 is defined as the approximate focus position.

Figure 17:
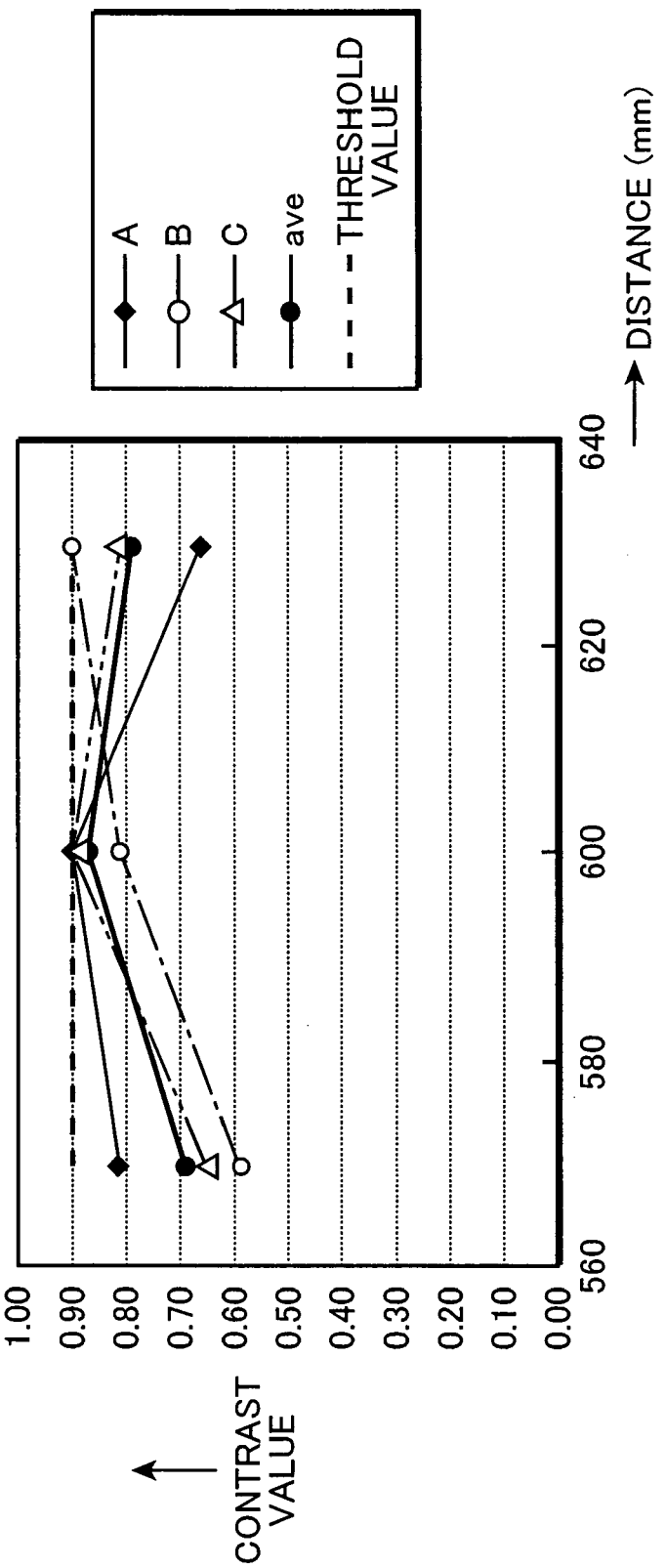
FIG. 17 is a graph showing a calculation result of contrast values and averages with respect to each of areas.

Table 1 shows the contrast values on the areas A, B, and C in the step t=1 through 3, and the calculation results on average contrast values. FIG. 17 is a graphical expression of the results shown in Table 1.

TABLE 1

|  | t = 1 | t = 2 distance | t = 3 |
| --- | --- | --- | --- |
|  | 570 | 600 | 630 |
| A | 0.81 | 0.90 | 0.66 |
| B | 0.59 | 0.81 | 0.90 |
| C | 0.66 | 0.90 | 0.81 |
| average | 0.69 | 0.87 | 0.79 |
| threshold value | 0.90 | 0.90 | 0.90 |

Figure 18A:
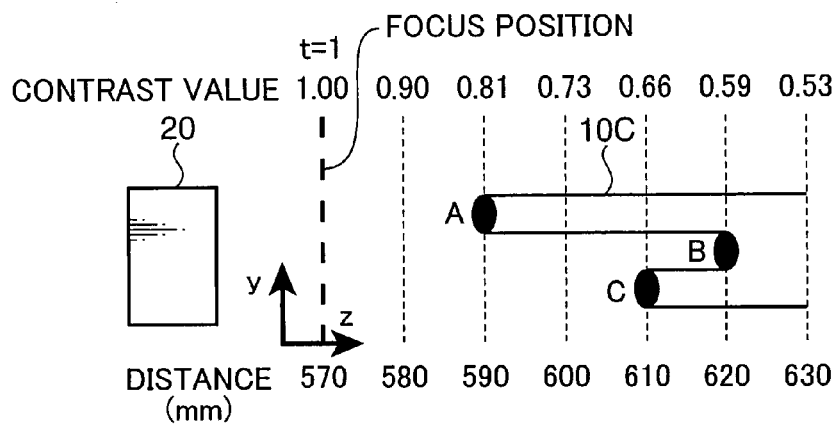
FIGS. 18A through 18C are schematic diagrams showing a manner as to how triangulation is executed based on a calculation result of the imaging contrast.
Figure 18B:
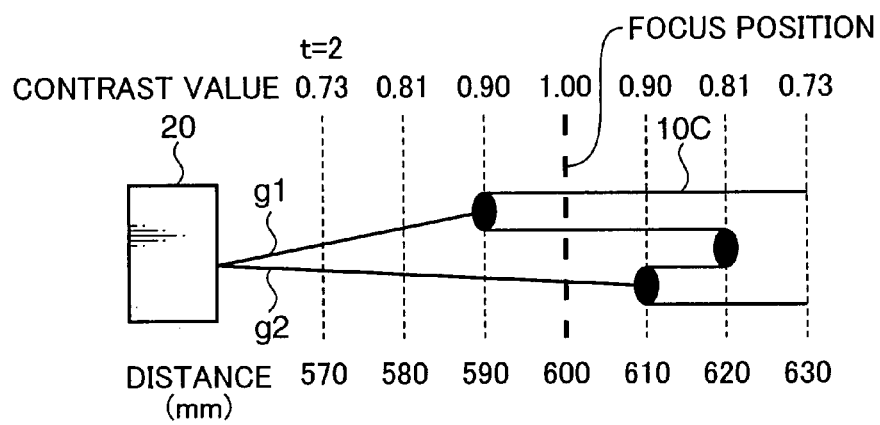
Figure 18C:
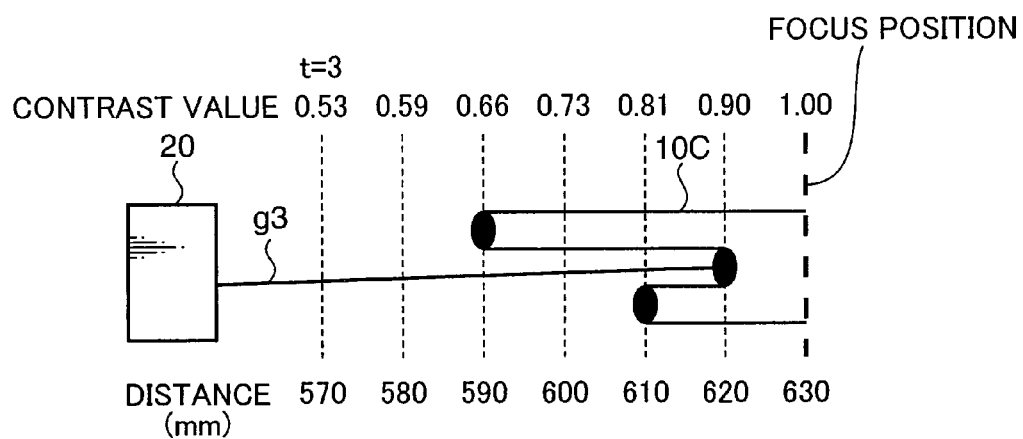

FIGS. 18A through 18C are schematic diagrams showing a manner as to how the triangulation is executed based on the imaging contrast calculation results obtained in the step t=1 through 3. FIG. 18A shows a condition corresponding to the step t=1. As mentioned above, when the focal length is set to 570 mm corresponding to the step t=1, the contrast value on any of the areas A, B, and C does not satisfy the requirement on the threshold value for determining a high contrast of 0.90. Accordingly, in this condition, triangulation is not performed.

FIG. 18B shows a condition corresponding to the step t=2. When the focal length is set to 600 mm corresponding to the step t=2, the contrast values on the areas A and C satisfy the requirement on the threshold value of 0.90. Accordingly, in this condition, the distance acquirer 264 calculates distances g1 and g2 from the three-dimensional shape measuring apparatus 20 to the areas A and C by triangulation. FIG. 18C shows a condition corresponding to the step t=3. When the focal length is set to 630 mm corresponding to the step t=3, the contrast value on the area B satisfies the requirement on the threshold value of 0.90. Accordingly, in this condition, the distance acquirer 264 calculates a distance g3 from the three-dimensional shape measuring apparatus 20 to the area B by triangulation. In this way, accurate distance information is obtained with respect to all the areas A, B, and C of the object 10C to be measured.

In performing the triangulation, the distance acquirer 264 estimates at which angle the slit light is supposed to be projected onto a targeted area for triangulation by referring to the approximate focus position obtained by the imaging contrast calculation. In the aforementioned example, a slit light beam projected with a rotation angle of the galvanometric mirror which is closest to the approximate focus position is selected based on the judgment that the approximate focus position is 600 mm.

The above example is described referring to FIGS. 19A and 19B. FIGS. 19A and 19B are schematic diagrams for describing an approach for estimating a position where silt light is projected. Let it be assumed one line V of sight which extends straightforward from the light receiving surface of the image sensor 222 via the light receiving optical system 221. As shown in FIG. 19A, plural slit light beams S1, S2, S3, S4, and S5 with different projection angles may be projected in the direction of the line V of sight. It is indispensable to specify the projection angle of a slit light beam for triangulation. Accordingly, it is necessary to specify i.e. estimate which one of the slit light beams S1 through S5 is supposed to be projected onto the targeted area for triangulation. The process of estimating the slit light beam is conducted by utilizing the aforementioned approximate focus position.

Specifically, an approximate light projection angle θ' is calculated based on the approximate focus position=600 mm, the light receiving angle φ with respect to the line V of sight, which is desirably defined as a right angle, and the known baseline length L. A slit light beam having a light projection angle closest to the approximate light projection angle θ' is selected by comparing the approximate light projection angle θ' with the light projection angles of the slit light beams S1 through S5. For instance, if the light projection angle of the slit light beam S3 is closest to the approximate light projection angle θ', it is estimated that the slit light beam S3 is projected onto the targeted area for triangulation. Then, as shown in FIG. 19B, the distance Z is calculated based on the light projection angle θ of the slit light beam S3, the light receiving angle φ, and the baseline length L.

Figure 20A:
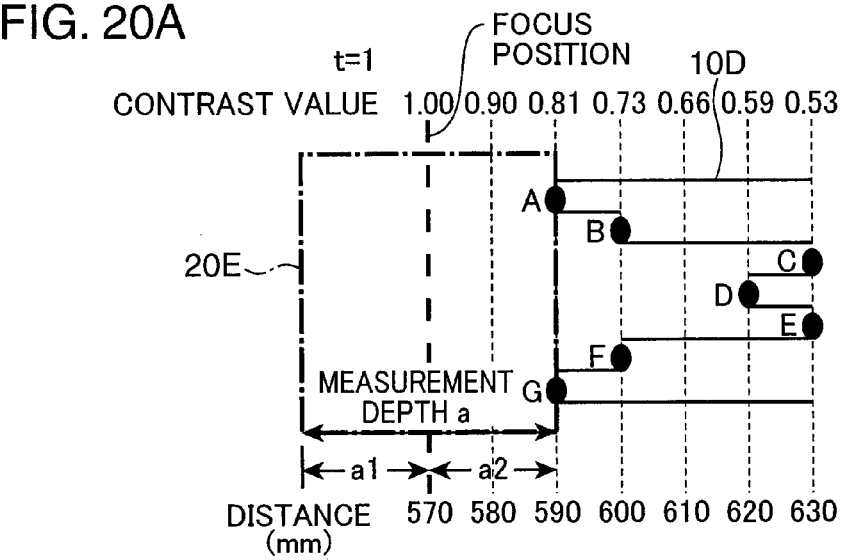
FIGS. 20A through 20C are schematic diagrams showing another approach for calculating an imaging contrast and specifying a high contrast area.
Figure 20B:
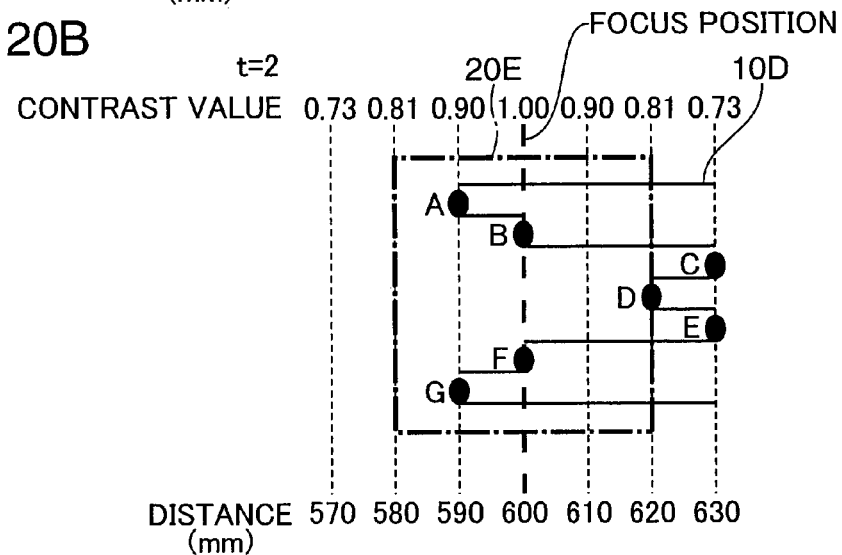
Figure 20C:
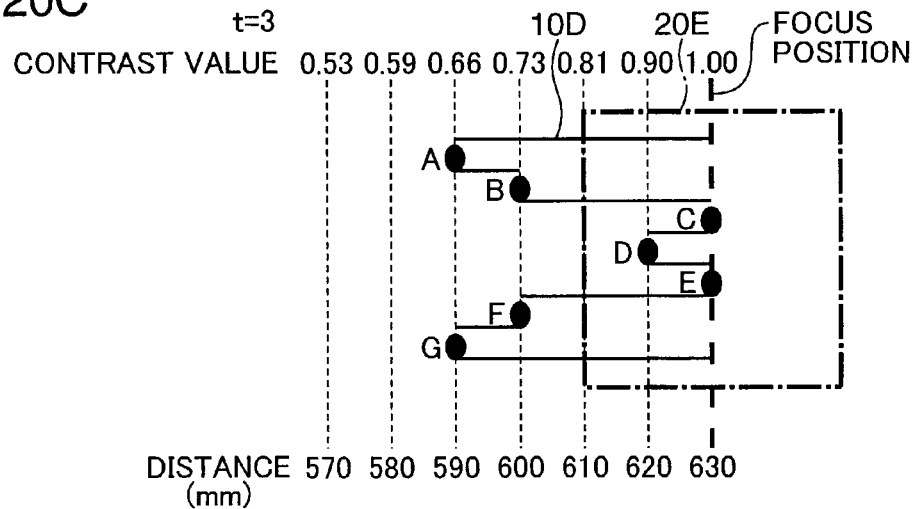

Next, the position adjustment of the measurement dimensions 20E is described. FIGS. 20A through 20C are schematic diagrams showing another approach for calculating an imaging contrast and specifying a high contrast area. The approach is described based on premises that: specific areas A, B, C, D, E, F, and G of an object 10D to be measured are distanced from the light receiver 22 of the three-dimensional shape measuring apparatus 20 by 590 mm, 600 mm, 630 mm, 620 mm, 630 mm, 600 mm, and 590 mm, respectively; and the measurement dimensions 20E has a measurement depth "a" of 40 mm in total, wherein a front range a1 has a depthwise dimension of 20 mm, and a rear range a2 has a depthwise dimension of 20 mm, with the focus position being defined in the middle of the measurement depth "a". The other premises are the same as those to be used in the description referring to FIGS. 16A through 16C.

Figure 21:
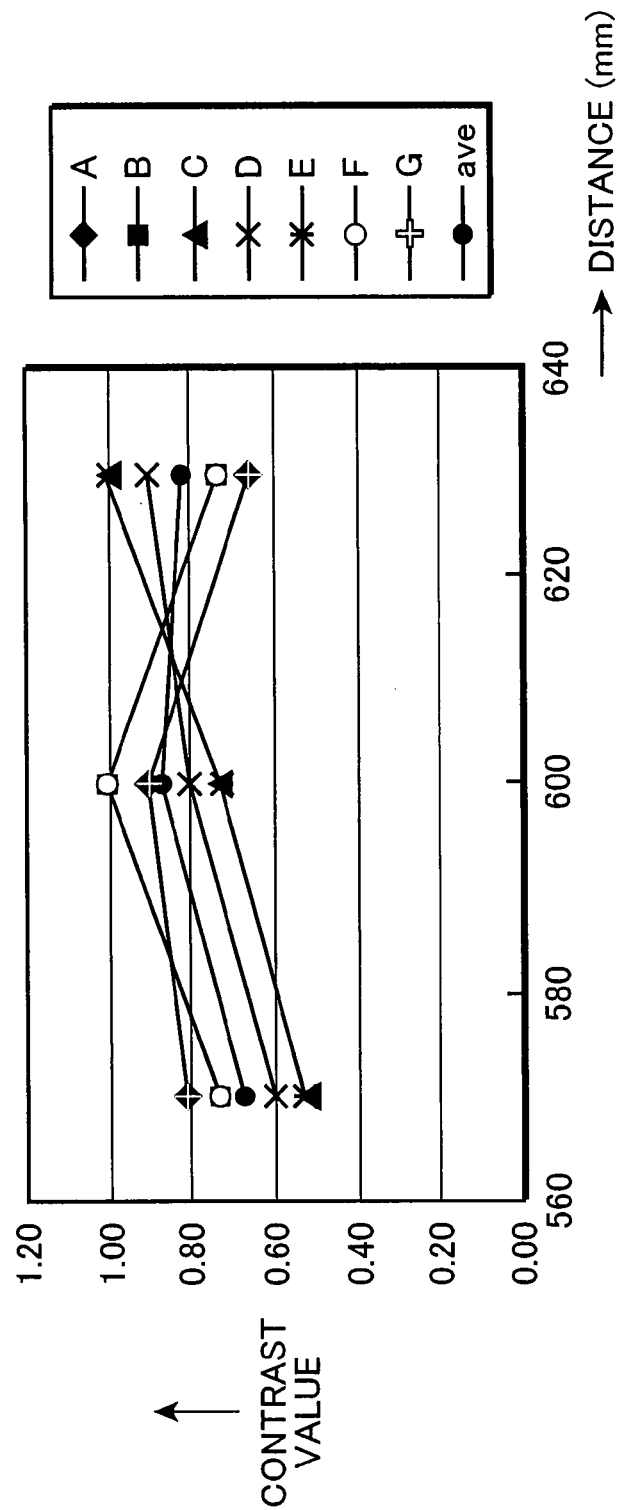
FIG. 21 is a graph showing a calculation result of contrast values and averages with respect to each of areas.

FIGS. 20A through 20C show imaging contrast calculation results, respectively, in the case where the focal length is changed in three steps i.e. the step t=1 through 3, using the initial focal length of 570 mm corresponding to the step t=1, and an interval of 30 mm. Table 2 shows the contrast values on the areas A through G in the step t=1 through 3, and the calculation results on average contrast values. FIG. 21 is a graphical expression of the results shown in Table 2.

TABLE 2

|  | t = 1 | t = 2 distance | t = 3 |
| --- | --- | --- | --- |
|  | 570 | 600 | 630 |
| A | 0.81 | 0.90 | 0.66 |
| B | 0.73 | 1.00 | 0.73 |
| C | 0.53 | 0.73 | 1.00 |
| D | 0.59 | 0.81 | 0.90 |
| E | 0.53 | 0.73 | 1.00 |
| F | 0.73 | 1.00 | 0.73 |
| G | 0.81 | 0.90 | 0.66 |
| average | 0.68 | 0.87 | 0.81 |

In the condition corresponding to the step t=1 shown in FIG. 20A, the contrast value on any of the areas A through G does not exceed the threshold value of 0.90. Accordingly, in the step t=1, an area which is subjected to triangulation is not specified. On the other hand, in the condition corresponding to the step t=2 shown in FIG. 20B, the contrast values on the areas A, B, F, and G satisfy the requirement on the threshold value of 0.90. Accordingly, in this condition, the areas A, B, F, and G are defined as targeted areas for triangulation, and detailed distance information concerning the areas A, B, F, and G is obtained. In the condition corresponding to the step t=3 shown in FIG. 20C, the contrast values on the areas C, D, and E satisfy the requirement on the threshold value of 0.90. Accordingly, in this condition, the areas C, D, and E are defined as targeted areas for triangulation, and detailed distance information concerning the areas C, D, and E is obtained. Further, the average contrast values in the conditions corresponding to the step t=1 through 3 are respectively 0.68, 0.87, and 0.81, which do not satisfy the requirement on the threshold value of 0.90. Accordingly, the focal length of 600 mm having a peak value corresponding to the step t=2 is defined as the approximate focus position.

As described referring to FIGS. 19A and 19B, the slit light projection is estimated, and the distance information concerning the areas A through G is calculated by triangulation, by referring to the approximate focus position. In this example, the distance information that the areas A, B, C, D, E, F, and G are distanced from the light receiver 22 by 590 mm, 600 mm, 630 mm, 620 mm, 630 mm, 600 mm, and 590 mm, respectively, is obtained. The focal length setter 266 estimates the shape of the object 10D to be measured based on the distance information concerning the areas A through G to adjust the position of the measurement dimensions 20E.

The position adjustment of the measurement dimensions 20E is performed in order to include all the areas of the object 10D to be measured within the measurement dimensions 20E by a one-time measurement. In other words, the position adjustment is performed to include all the areas A through G of the object 10D to be measured within the measurement depth "a".

Figure 22:
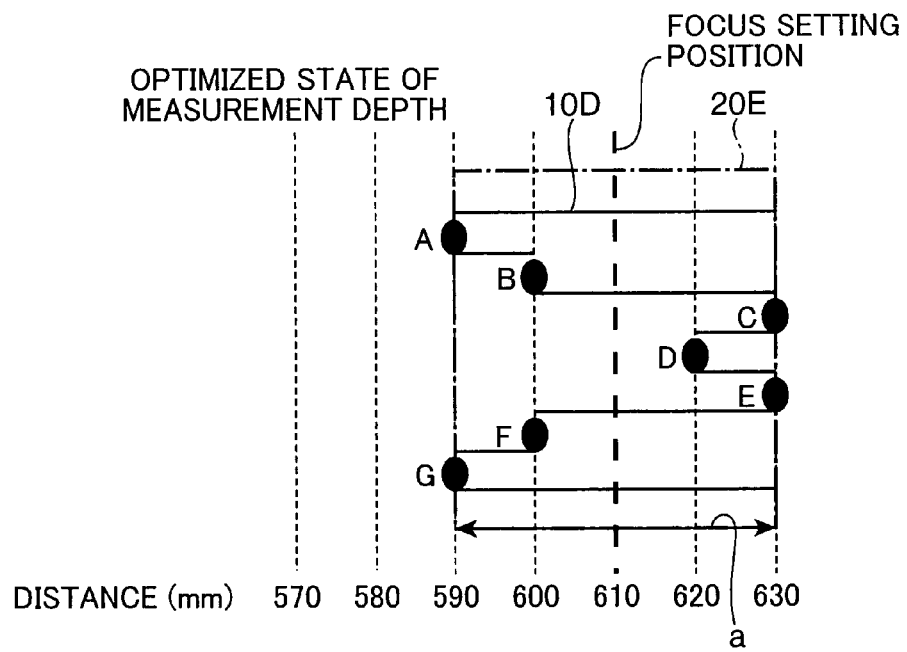
FIG. 22 is a diagram schematically showing a state that the position of the measurement dimensions is adjusted in such a manner that an object to be measured is included in the measurement dimensions.

FIG. 22 is a diagram schematically showing a state that the position of the measurement dimensions 20E is adjusted to cover the object 10D to be measured. In FIG. 22, the measurement depth "a" is 40 mm, and the focal length is set in such a manner as to locate the area closest to the three-dimensional shape measuring apparatus 20 i.e. the areas A and G=590 mm, and the area farthest from the three-dimensional shape measuring apparatus 20 i.e. the areas C and E=630 mm within the measurement depth "a" within the distance information concerning the areas A through G. In this example, by setting the focal length to 610 mm, all the areas A through G are included in the measurement depth "a". Accordingly, the focal length is set to 610 mm. The thus-set focal length is the focal length acquired by the AF control, and an imaging operation for actual measurement is performed by using the focal length.

It is desirable to minimize the projection area where slit light emitted from the light projector 21 is projected for scanning, i.e. a scanning area by slit laser beams, depending on the shape of the object to be measured, in the aspect of shortening a measurement time and a computation time. The projection angle adjuster 267 optimizes the scanning projection angle of slit light. Specifically, in performing AF control, the projection angle adjuster 267 determines an area where the object to be measured is estimated to be located, based on the result of projecting slit light for scanning the object to be measured, by using the focal length as a first distance, and sets a scanning projection angle depending on the estimated area of the object to be measured in projecting succeeding slit light for scanning by using a second distance different from the first distance.

Figure 23:
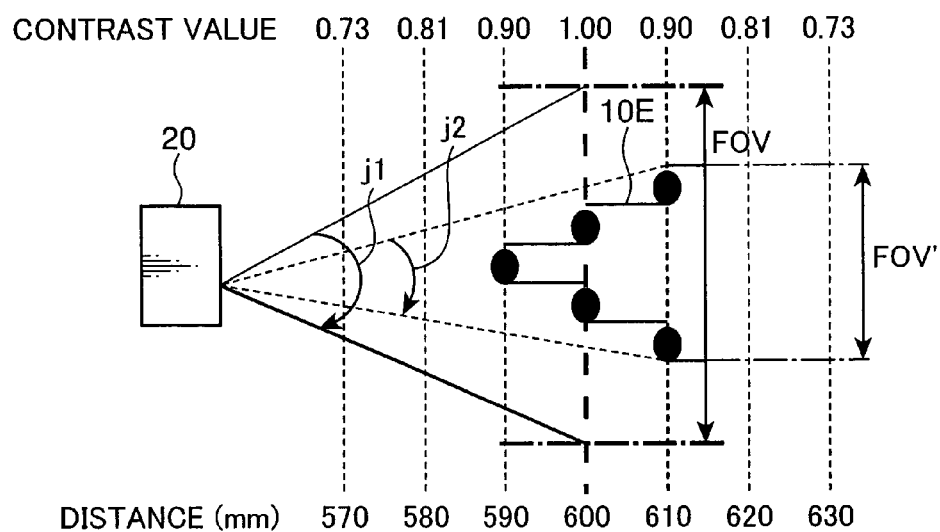
FIG. 23 is a diagram for describing an operation of a projection angle adjuster.

FIG. 23 is a schematic diagram for describing the operation of the projection angle adjuster 267. In a first-time scanning projection at a focal length of e.g. 570 mm, the scanning projection range is set identical to a field of view FOV of the three-dimensional shape measuring apparatus 20 i.e. a scanning projection angle=j1. Then, the scanning projection is performed with respect to an object 10E to be measured. The contrast acquirer 262 calculates contrast values on plural areas based on the image obtained by the scanning projection. Accordingly, the estimated area where the object 10E to be measured is supposed to be located can be approximately determined based on the calculation results.

In the example shown in FIG. 23, the object 10E to be measured has relatively small dimensions, as compared with the field of view FOV. Accordingly, it is not required to project light onto an area around the targeted area where the object 10E to be measured is estimated to be located. In this embodiment, the projection angle adjuster 267 adjusts the scanning projection range to a field of view FOV' capable of minimally covering the object 10E to be measured i.e. a scanning projection angle=j2(<j1), and a second-time scanning projection is performed at a focal length of e.g. 600 mm. With this arrangement, unwanted light projection and unwanted computation processing can be avoided.

[Description on Operation Flow]

Figure 24:
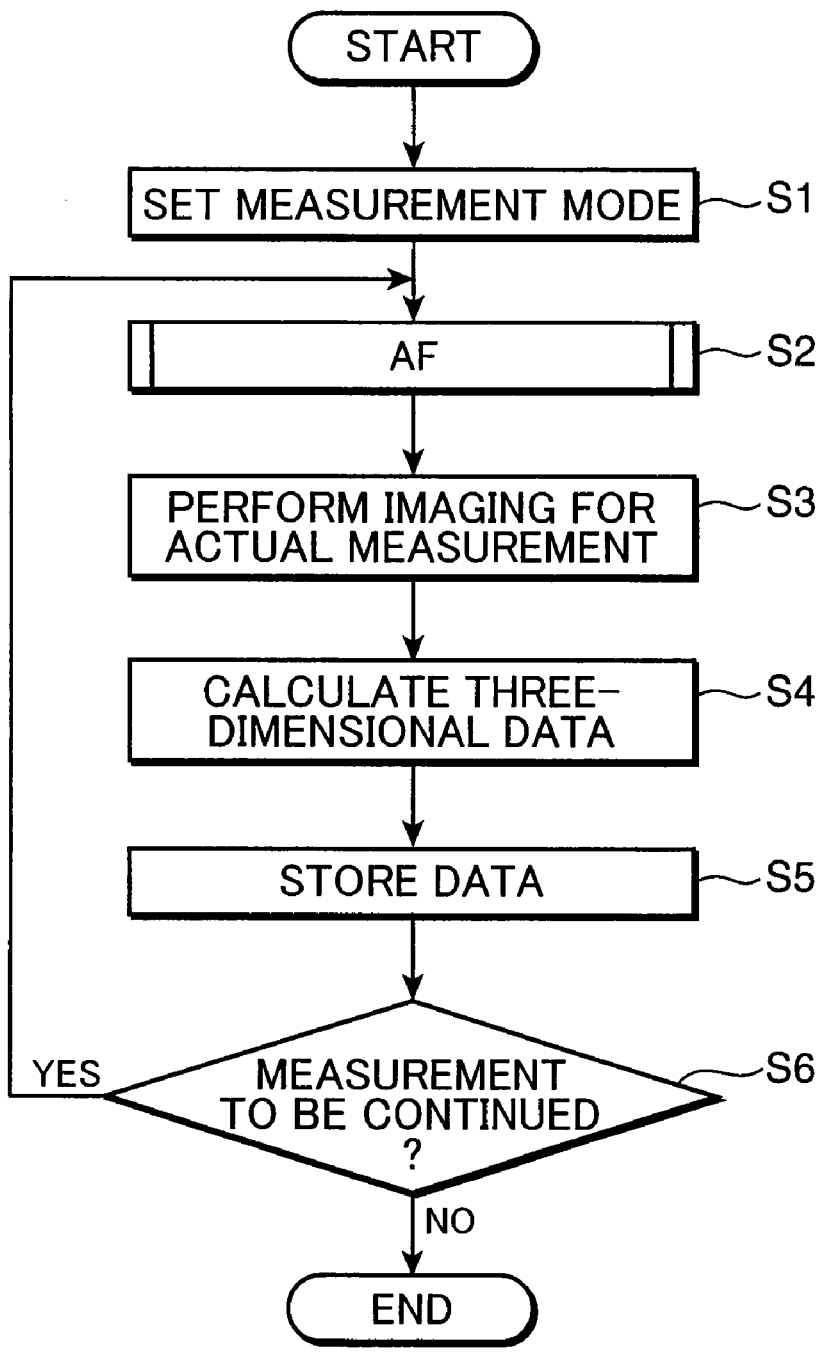
FIG. 24 is a flowchart showing a three-dimensional shape measurement flow to be executed by the three-dimensional shape measuring apparatus.

An operation to be executed by the three-dimensional shape measuring apparatus 20 having the above arrangement is described. FIG. 24 is a flowchart showing a three-dimensional shape measurement flow to be executed by the three-dimensional shape measuring apparatus 20. First, when a measurement mode is set in response to issuance of an operation signal from an unillustrated operation section to the three-dimensional shape measuring apparatus 20 (Step S1), the AF controller 26 (see FIG. 10) is activated to execute an auto-focus (AF) processing with respect to the object to be measured (Step S2). The auto-focus processing flow will be described later in detail referring to FIG. 25.

Then, an imaging operation for actual measurement with respect to the object to be measured is performed by using the focal length obtained by the auto-focus processing (Step S3). The imaging operation for actual measurement corresponds to the scanning projection of slit light to be performed in the aforementioned auto-focus processing. Then, two-dimensional image data obtained by the imaging operation is stored in the data memory 24.

Thereafter, the two-dimensional image data is transferred to an unillustrated personal computer or a like external device via the I/F 28, and three-dimensional data concerning the object to be measured is calculated by triangulation, based on the two-dimensional image data (Step S4). The three-dimensional data is stored in a predetermined memory, as coordinate value (x, y, z) data (Step S5). Then, it is judged whether the measurement is to be continued (Step S6). If it is judged that the measurement is to be continued (YES in Step S6), the routine returns to Step S2. If, on the other hand, it is judged that the measurement is to be ended (NO in Step S6), the routine ends.

Figure 25:
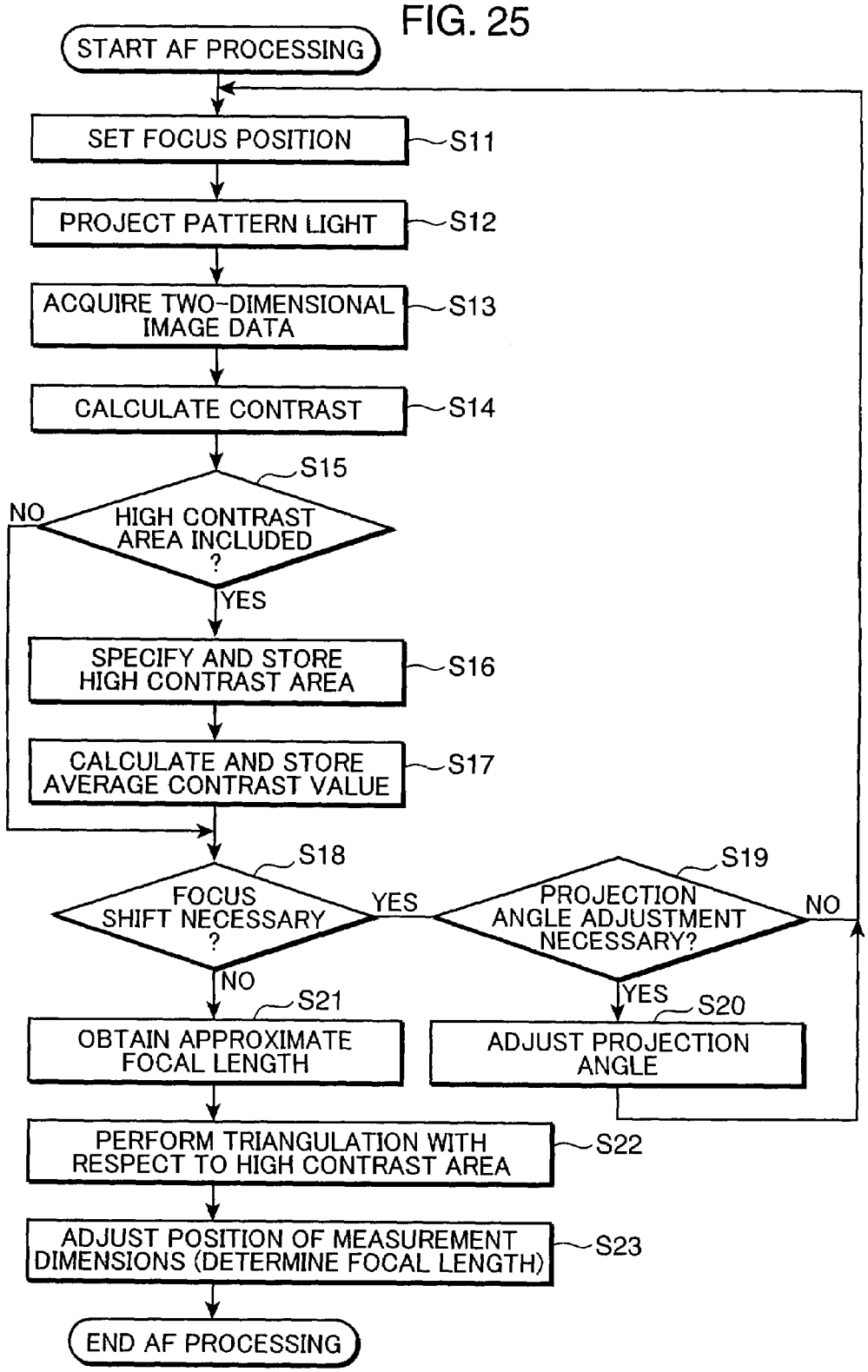
FIG. 25 is a flowchart showing an auto-focus processing flow to be executed by the AF controller.

FIG. 25 is a flowchart showing an auto-focus processing to be executed by the AF controller 26. When the auto-focus processing is started, the focus shifter 261 (see FIG. 11) sets the focal length of the light receiving optical system 221 of the light receiver 22 to a predetermined first distance (Step S11). In the examples shown in FIGS. 16A, 16B, 20A, and 20B, the initial focal length is set to 570 mm.

Then, the light projector 21 projects pattern light onto the object to be measured with the thus set focal length (Step S12). Specifically, slit laser beams are projected for scanning the object to be measured by turning on and off the laser light source 211 at a predetermined timing, while rotating the galvanometric mirror 213. A part of the light reflected on the object to be measured is received on the image sensor 222 via the light receiving optical system 221 of the light receiver 22, and two-dimensional image data concerning the object to be measured, which corresponds to slit images, is acquired (Step S13). After the two-dimensional image data is digitized by the output processing circuit 23, the digitized image data is temporarily stored in the data memory 24.

The two-dimensional image data is read by the contrast acquirer 262 of the AF controller 26, and the imaging contrast is calculated with respect to each of the areas e.g. the areas A, B, and C shown in FIGS. 16A and 16B (Step S14). Then, the area specifier 263 judges whether the two-dimensional image data includes a high contrast area where the contrast value exceeds a predetermined threshold value (Step S15).

If it is judged that the high contrast area is included in the two-dimensional image data (YES in Step S15), the area specifier 263 writes position information concerning the high contrast area into the data buffer 265 (Step S16). Then, the area specifier 263 calculates an average contrast value, and writes the average contrast value into the data buffer 265 (Step S17).

Then, it is judged whether the focal length is to be shifted (Step S18). If a software sequence predefined in the focus shifter 261 has not been completed (YES in Step S18), the projection angle adjuster 267 judges whether it is necessary to adjust the projection angle depending on the shape of the object to be measured (Step S19). If it is judged that the projection angle adjustment is necessary (YES in Step S19), the projection angle adjuster 267 adjusts the scanning range of the slit laser beams depending on the shape of the object to be measured (Step S20). If, on the other hand, it is judged that the projection angle adjustment is not necessary (NO in Step S19), the routine returns to Step S11 to cyclically repeat the processing. In Step S11, the focal length is shifted by a predetermined length e.g. from 570 mm to 600 mm in accordance with a software sequence on the focal length.

If the software sequence on the focal length is completed (NO in Step S18), the distance acquirer 264 acquires an approximate focal length, based on the average contrast value which has been obtained in Step S17 with respect to each of the focal lengths (Step S21). The approximate focal length is acquired, as mentioned above, by e.g. determining the focal length where the average contrast value exceeds the predetermined threshold value, or determining a peak value of the average contrast value.

Then, the distance acquirer 264 performs triangulation with respect to each of the areas which have been specified as a high contrast area based on the different focal lengths in Step S16, and acquires detailed distance information concerning the respective areas (Step S22).

Thereafter, the focal length setter 266 performs the position adjustment of the measurement dimensions, based on the distance information, by using the approach described referring to FIG. 22 (Step S23). Thus, the auto-focus processing is ended. The focal length obtained by the position adjustment of the measurement dimensions is defined as the focal length to be used in an imaging operation for actual measurement, which will be performed after the position adjustment of the measurement dimensions.

The invention has been described by way of the aforementioned embodiment, but is not limited thereto. The following modifications are applicable, for instance.

(1) In the embodiment, the position adjustment of the measurement dimensions is performed in such a manner that the areas of the object to be measured which are closest to and farthest from the three-dimensional shape measuring apparatus within the distance information obtained by the distance acquirer 264 are simply included in the measurement dimensions. In addition to the above, position adjustment of the measurement dimensions depending on the shape of the object to be measured may be performed after weighing the distance information concerning the respective areas. In the modification, in the case where the distance information is intensively obtained from an area having a specific distance or around the area, more accurate three-dimensional shape measurement can be performed by focusing the area or around the area.

(2) In the case where the light receiving lens elements constituting the light receiving optical system 221 are exchangeable, and the measurement dimensions are different among the light receiving lens elements, it is desirable to provide a lens information output section capable of acquiring lens information concerning the light receiving lens elements incorporated in the light receiving optical system 221 and rewriting the information stored in the measurement dimensions storage 25.

(3) In the embodiment, the invention is applied to auto-focus adjustment of the three-dimensional shape measuring apparatus 20. Alternatively, the focus adjusting method of the embodiment is applicable to an optical device other than the three-dimensional shape measuring apparatus 20. For instance, the invention may be applicable to a digital still camera, a digital video camera, or a like measuring device.

The foregoing embodiment and/or modifications primarily include the inventions having the following arrangements.

A three-dimensional shape measuring method according to an aspect of the invention is a method for measuring a three-dimensional shape of an object to be measured after performing a focus adjustment with respect to the object to be measured, by using a non-contact three-dimensional shape measuring apparatus having a predetermined measurement depth including a front position and a rear position with respect to a focus position, as measurement dimensions. The method includes, in performing the focus adjustment: repeating an operation of acquiring a two-dimensional image concerning the object to be measured by projecting predetermined pattern light onto the object to be measured and by receiving light reflected thereon, and an operation of calculating an imaging contrast on a plurality of areas of the acquired two-dimensional image a predetermined number of times, with a focal length of the three-dimensional shape measuring apparatus being changed each time the acquiring operation and the calculating operation are performed; extracting a high contrast area where the imaging contrast exceeds a predetermined threshold value with respect to each of the two-dimensional images acquired at the different focal lengths; acquiring distance information concerning the object to be measured by triangulation, based on a position on the object to be measured corresponding to the high contrast area, a light projecting position, and a light receiving position; and performing a position adjustment of the measurement dimensions with respect to the object to be measured, based on the distance information.

In the above arrangement, the high contrast area on the two-dimensional image acquired concerning the object to be measured is specified, using the imaging contrast. Then, the distance information is acquired by performing the triangulation with respect to the position on the object to be measured corresponding to the high contrast area. In other words, the triangulation is performed, with the area specified by the imaging contrast technique being exclusively used as an area for distance measurement. With this arrangement, efficient triangulation processing can be executed, and accurate distance information can be acquired. By repeating the acquiring operation and the calculating operation the predetermined number of times at the different focal lengths, accurate distance information can be obtained concerning the each of the areas of the two-dimensional image, even if the object to be measured has a projected surface or a recessed surface. By performing the position adjustment of the measurement dimensions having the predetermined measurement depth based on the thus acquired distance information concerning the object to be measured, the position adjustment of the measurement dimensions can be speedily and accurately performed depending on the shape of the object to be measured.

A three-dimensional shape measuring apparatus according to another aspect of the invention is a non-contact three-dimensional shape measuring apparatus provided with a predetermined measurement depth including a front position and a rear position with respect to a focus position, as measurement dimensions. The apparatus includes: a light projecting section for projecting predetermined measurement light onto an object to be measured; an imaging section for receiving a light component of the measurement light reflected on the object to be measured via an optical system capable of adjusting a focal length of the three-dimensional shape measuring apparatus to acquire a two-dimensional image concerning the object to be measured; a contrast deriving section for calculating an imaging contrast on a plurality of areas of the two-dimensional image to derive the imaging contrast; a distance deriving section for performing triangulation with respect to each of the areas of the two-dimensional image to derive distance information concerning the object to be measured with respect to the each of the areas; a control calculator for repeating an operation of specifying a high contrast area where the imaging contrast exceeds a predetermined threshold value, based on a calculation result by the contrast deriving section a predetermined number of times, with a focal length of the imaging section being changed each time the specifying operation is performed, and for causing the distance deriving section to perform the triangulation with respect to the high contrast area; and a measurement dimensions adjuster for performing a position adjustment of the measurement dimensions with respect to the object to be measured, based on the distance information obtained by the triangulation.

In the above arrangement, the high contrast area on the two-dimensional image, which is acquired by the imaging section concerning the object to be measured, is specified by the contrast deriving section. The specifying operation is repeated the predetermined number of times at the different focal lengths. Then, the distance information is acquired by causing the distance deriving section to perform the triangulation with respect to the position on the object to be measured corresponding to the high contrast area. In other words, the triangulation is performed by the distance deriving section, with the area specified by the contrast deriving section being exclusively used as an area for distance measurement. With this arrangement, efficient triangulation processing can be executed, and accurate distance information can be acquired with respect to each of the areas of the two-dimensional image. The position adjustment of the measurement dimensions having the predetermined measurement depth is performed by the measurement dimensions adjuster, based on the thus acquired distance information. This arrangement enables to perform the position adjustment of the measurement dimensions speedily and accurately depending on the shape of the object to be measured.

In the above arrangement, preferably, the light projecting section may project predetermined pattern light onto the object to be measured, and the distance deriving section may perform the triangulation based on a projection angle of the pattern light, a receiving angle of the pattern light, and a distance between a light projecting position and a light receiving position. With this arrangement, data for the imaging contrast calculation and data for the triangulation can be commonly used by causing the light projecting section to project the pattern light.

In the above arrangement, preferably, the light projecting section may include a light source for generating slit light with an intensity thereof being modulated, and a rotating mirror for projecting the slit light onto the object to be measured for scanning the object to be measured. With this arrangement, the focus adjustment i.e. the position adjustment of the measurement dimensions can be performed by utilizing the light projecting section applied with a so-called light cutting method.

In use of the light projecting section, preferably, the imaging section may include an area sensor having a light receiving area with a range corresponding to a scanning projection angle of the slit light, and the contrast deriving section may obtain a luminance sum distribution concerning one projection area where the slit light is projected based on an output value from each of pixels of the area sensor corresponding to the projection area, and assess the imaging contrast based on a degree of rising of a curve of the luminance sum distribution.

In the case where intermittent light is projected with use of a rotating mirror, there is a case that integration values of luminance to be actually detected by the area sensor may be identical to each other, despite that histograms concerning one projection area on the light receiving surface of the area sensor are different from each other depending on the distance from the focus position. However, in this arrangement, degrees of rising of curves of luminance sum distributions are different because the histograms are different. Thus, contrast assessment can be accurately performed by considering the degree of rising of the curve of the luminance sum distribution.

In the above arrangement, preferably, the contrast deriving section may derive approximate distance information concerning the object to be measured with respect to the each of the areas of the two-dimensional image, based on a calculation result of the imaging contrast, and the distance deriving section may estimate a projection angle of the slit light based on the approximate distance information to perform the triangulation. With this arrangement, the projection angle of the slit light which is indispensable in performing the triangulation can be easily obtained based on the approximate distance information derived by the contrast deriving section.

In the above arrangement, preferably, the control calculator may cause the light projecting section to project the slit light onto the object to be measured for scanning the object to be measured by using a focal length of the imaging section as a first distance, and determine an area where the object to be measured is estimated to be located, based on the imaging contrast calculated by the contrast deriving section, and the control calculator may set a scanning projection angle of the slit light depending on the area where the object to be measured is estimated to be located, in causing the light projecting section to project succeeding slit light for scanning by using a focal length of a second distance different from the first distance. With this arrangement, for instance, scanning projection of the succeeding slit light can be restricted to the area where the object to be measured is estimated to be located, which is estimated by the previous scanning projection. This enables to further shorten the measurement time and the computation time.

In the above arrangement, preferably, the measurement dimensions adjuster may set the focus position within the measurement dimensions depending on a shape of the object to be measured which is estimated based on the distance information to perform the position adjustment of the measurement dimensions. Preferably, the measurement dimensions adjuster may perform the position adjustment of the measurement dimensions in such a manner that the measurement depth includes a point on the object to be measured which is closest to the three-dimensional shape measuring apparatus, and a point on the object to be measured which is farthest from the three-dimensional shape measuring apparatus in the distance information. With these arrangements, the position adjustment of the measurement dimensions can be easily and accurately performed depending on the shape of the object to be measured.

A focus adjusting method according to yet another aspect of the invention is a method for adjusting a focus with respect to an object to be imaged by an image sensing apparatus provided with a predetermined imaging depth including a front position and a rear position with respect to a focus position, as an imaging range. The method includes: repeating an operation of acquiring a two-dimensional image concerning the object to be imaged by projecting predetermined pattern light onto the object to be imaged and by receiving light reflected thereon, and an operation of calculating an imaging contrast on a plurality of areas of the acquired two-dimensional image a predetermined number of times, with a focal length of the image sensing apparatus being changed each time the acquiring operation and the calculating operation are performed; extracting a high contrast area where the imaging contrast exceeds a predetermined threshold value with respect to each of the two-dimensional images acquired at the different focal lengths; acquiring distance information concerning the object to be imaged by triangulation, based on a position on the object to be imaged corresponding to the high contrast area, a light projecting position, and a light receiving position; performing a position adjustment of the imaging range with respect to the object to be imaged, based on the distance information.

According to the invention, accurate distance information concerning multi-points on the object to be measured can be efficiently obtained by combining plane distance measurement based on imaging contrast, and multi-point distance measurement by triangulation. With this arrangement, the position adjustment of the measurement depth can be speedily and accurately performed. In other words, unlike the conventional arrangement, in which multiple measurements by shifting the measurement dimensions are required to compensate an improper setting of the measurement dimensions with respect to the object to be measured, the invention is advantageous in suppressing such a drawback, thereby enabling to shorten the measurement time.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A method for measuring a three-dimensional shape of an object to be measured after performing a focus adjustment with respect to the object to be measured, by using a non-contact three-dimensional shape measuring apparatus having a predetermined measurement depth including a front position and a rear position with respect to a focus position, as measurement dimensions, the method comprising, in performing the focus adjustment:

repeating an operation of acquiring a two-dimensional image concerning the object to be measured by projecting predetermined pattern light onto the object to be measured and by receiving light reflected thereon, and an operation of calculating an imaging contrast on a plurality of areas of the acquired two-dimensional image a predetermined number of times, with a focal length of the three-dimensional shape measuring apparatus being changed each time the acquiring operation and the calculating operation are performed;

extracting a high contrast area where the imaging contrast exceeds a predetermined threshold value with respect to each of the two-dimensional images acquired at the different focal lengths;

acquiring distance information concerning the object to be measured by triangulation, based on a position on the object to be measured corresponding to the high contrast area, a light projecting position, and a light receiving position; and performing a position adjustment of the measurement dimensions with respect to the object to be measured, based on the distance information.

2. A non-contact three-dimensional shape measuring apparatus provided with a predetermined measurement depth including a front position and a rear position with respect to a focus position, as measurement dimensions, the apparatus comprising:
- a light projecting section for projecting predetermined measurement light onto an object to be measured;
- an imaging section for receiving a light component of the measurement light reflected on the object to be measured via an optical system capable of adjusting a focal length of the three-dimensional shape measuring apparatus to acquire a two-dimensional image concerning the object to be measured;
- a contrast deriving section for calculating an imaging contrast on a plurality of areas of the two-dimensional image to derive the imaging contrast;
- a distance deriving section for performing triangulation with respect to each of the areas of the two-dimensional image to derive distance information concerning the object to be measured with respect to the each of the areas;
- a control calculator for repeating an operation of specifying a high contrast area where the imaging contrast exceeds a predetermined threshold value, based on a calculation result by the contrast deriving section a predetermined number of times, with a focal length of the imaging section being changed each time the specifying operation is performed, and for causing the distance deriving section to perform the triangulation with respect to the high contrast area; and
- a measurement dimensions adjuster for performing a position adjustment of the measurement dimensions with respect to the object to be measured, based on the distance information obtained by the triangulation.

3. The three-dimensional shape measuring apparatus according to claim 2, wherein
the light projecting section projects predetermined pattern light onto the object to be measured, and
the distance deriving section performs the triangulation based on a projection angle of the pattern light, a receiving angle of the pattern light, and a distance between a light projecting position and a light receiving position.

4. The three-dimensional shape measuring apparatus according to claim 3, wherein
the light projecting section includes a light source for generating slit light with an intensity thereof being modulated, and a rotating mirror for projecting the slit light onto the object to be measured for scanning the object to be measured.

5. The three-dimensional shape measuring apparatus according to claim 4, wherein
the imaging section includes an area sensor having a light receiving area with a range corresponding to a scanning projection angle of the slit light, and
the contrast deriving section obtains a luminance sum distribution concerning one projection area where the slit light is projected based on an output value from each of pixels of the area sensor corresponding to the projection area, and assesses the imaging contrast based on a degree of rising of a curve of the luminance sum distribution.

6. The three-dimensional shape measuring apparatus according to claim 4, wherein
the contrast deriving section derives approximate distance information concerning the object to be measured with respect to the each of the areas of the two-dimensional image, based on a calculation result of the imaging contrast, and
the distance deriving section estimates a projection angle of the slit light based on the approximate distance information to perform the triangulation.

7. The three-dimensional shape measuring apparatus according to claim 4, wherein
the control calculator causes the light projecting section to project the slit light onto the object to be measured for scanning the object to be measured by using a focal length of the imaging section as a first distance, and determines an area where the object to be measured is estimated to be located, based on the imaging contrast calculated by the contrast deriving section, and
the control calculator sets a scanning projection angle of the slit light depending on the area where the object to be measured is estimated to be located, in causing the light projecting section to project succeeding slit light for scanning by using a focal length of a second distance different from the first distance.

8. The three-dimensional shape measuring apparatus according to claim 2, wherein
the measurement dimensions adjuster sets the focus position within the measurement dimensions depending on a shape of the object to be measured which is estimated based on the distance information to perform the position adjustment of the measurement dimensions.

9. The three-dimensional shape measuring apparatus according to claim 2, wherein
the measurement dimensions adjuster performs the position adjustment of the measurement dimensions in such a manner that the measurement depth includes a point on the object to be measured which is closest to the three-dimensional shape measuring apparatus, and a point on the object to be measured which is farthest from the three-dimensional shape measuring apparatus in the distance information.

10. A method for adjusting a focus with respect to an object to be imaged by an image sensing apparatus provided with a predetermined imaging depth including a front position and a rear position with respect to a focus position, as an imaging range, the method comprising:
- repeating an operation of acquiring a two-dimensional image concerning the object to be imaged by projecting predetermined pattern light onto the object to be imaged and by receiving light reflected thereon, and an operation of calculating an imaging contrast on a plurality of areas of the acquired two-dimensional image a predetermined number of times, with a focal length of the image sensing apparatus being changed each time the acquiring operation and the calculating operation are performed;
- extracting a high contrast area where the imaging contrast exceeds a predetermined threshold value with respect to each of the two-dimensional images acquired at the different focal lengths;
- acquiring distance information concerning the object to be imaged by triangulation, based on a position on the object to be imaged corresponding to the high contrast area, a light projecting position, and a light receiving position; and
- performing a position adjustment of the imaging range with respect to the object to be imaged, based on the distance information.

* * * * *